United States Patent
Watanabe et al.

[19]

[11] Patent Number: 6,006,058
[45] Date of Patent: Dec. 21, 1999

[54] PROCESS CARTRIDGE AND ELECTROPHOTOGRAPHIC IMAGE FORMING APPARATUS HAVING AN IMPROVED DRIVING SYSTEM

[75] Inventors: Kazushi Watanabe, Mishima; Tadayuki Tsuda, Susono; Shinichi Sasaki, Fujisawa; Isao Ikemoto, Kawasaki; Atsushi Numagami, Mishima; Katsunori Yokoyama, Susono, all of Japan

[73] Assignee: Canon Kabushiki Kaisha, Tokyo, Japan

[21] Appl. No.: 08/939,125

[22] Filed: Sep. 26, 1997

[30] Foreign Application Priority Data

Sep. 26, 1996 [JP] Japan .................................. 8-227533
Sep. 26, 1996 [JP] Japan .................................. 8-277524
Sep. 25, 1997 [JP] Japan .................................. 9-279617

[51] Int. Cl.$^6$ .................................................. G03G 15/00
[52] U.S. Cl. ............................................................... 399/167
[58] Field of Search ................................. 399/111, 113, 399/116, 117, 159, 167

[56] References Cited

U.S. PATENT DOCUMENTS

| | | | |
|---|---|---|---|
| 3,734,548 | 5/1973 | Kieves ..................................... | 403/353 |
| 4,025,210 | 5/1977 | Johnson ................................... | 403/240 |
| 4,829,335 | 5/1989 | Kanemitsu et al. ..................... | 399/111 |
| 4,975,743 | 12/1990 | Surti ........................................ | 399/111 |
| 5,023,660 | 6/1991 | Ebata et al. .............................. | 399/111 |
| 5,132,728 | 7/1992 | Suzaki et al. ........................... | 399/167 |
| 5,151,734 | 9/1992 | Tsuda et al. ............................. | 399/111 |
| 5,223,893 | 6/1993 | Ikemoto et al. ......................... | 399/111 |
| 5,371,576 | 12/1994 | Gonda ...................................... | 399/167 |
| 5,749,028 | 5/1998 | Damiji et al. ........................... | 399/117 |

FOREIGN PATENT DOCUMENTS

| | | |
|---|---|---|
| 0 098 777 A2 | 1/1984 | European Pat. Off. . |
| 0 797 125 A1 | 9/1997 | European Pat. Off. . |
| 8-270642 | 10/1996 | Japan . |
| 446033 | of 1936 | United Kingdom . |

OTHER PUBLICATIONS

European Search Report.

*Primary Examiner*—William J. Royer
*Attorney, Agent, or Firm*—Fitzpatrick, Cella, Harper & Scinto

[57] ABSTRACT

A process cartridge detachably mountable to a main assembly of an electrophotographic image forming apparatus, wherein the main assembly includes a motor, a main assembly side gear for receiving driving force from the motor and a non-twisted recess which is substantially coaxial with the gear, the process cartridge includes an electrophotographic photosensitive drum; a process device actable on the photosensitive drum; and a non-twisted projection engageable with the recess, the projection being provided at a longitudinal end of the photosensitive drum, wherein when the main assembly side gear rotates with the recess and projection engaged with each other, rotational driving force is transmitted from the gear to the photosensitive drum through engagement between the recess and the projection.

61 Claims, 25 Drawing Sheets

PROCESS CARTRIDGE AND ELECTROPHOTOGRAPHIC IMAGE FORMING APPARATUS HAVING AN IMPROVED DRIVING SYSTEM

FIELD OF THE INVENTION AND RELATED ART

The present invention relates to a process cartridge and an electrophotographic image forming apparatus.

Here, the electrophotographic image forming apparatus forms an image on a recording material using an electrophotographic image formation process. Examples of the electrophotographic image forming apparatus includes an electrophotographic copying machine, an electrophotographic printer (laser beam printer, LED printer or the like), a facsimile machine and a word processor or the like.

The process cartridge contains, integrally, an electrophotographic photosensitive member and charging means, developing means or cleaning means, and is detachably mountable relative to a main assembly of the image forming apparatus. It may integrally contain the electrophotographic photosensitive member and at least one of the charging means, the developing means and the cleaning means. As another example, it may contain the electrophotographic photosensitive member and at least the developing means.

In an electrophotographic image forming apparatus using an electrophotographic image forming process, the process cartridge is used, which contains the electrophotographic photosensitive member and process means actable on said electrophotographic photosensitive member, and which is detachably mountable as a unit to a main assembly of the image forming apparatus (process cartridge type). With this process cartridge type, the maintenance of the apparatus can be carried out in effect by the user without depending on a serviceman. Therefore, the process cartridge type is now widely used in electrophotographic image forming apparatuses.

The present invention is directed to a further improvement of such a process cartridge.

A driving system for a photosensitive member in a process cartridge type, is disclosed in U.S. Pat. Nos. 4,829,335 and 5,023,660.

SUMMARY OF THE INVENTION

Accordingly, it is a principal object of the present invention to provide a process cartridge and an electrophotographic image forming apparatus wherein the operability when the process cartridge is removed from the main assembly of an image forming apparatus is improved.

It is another object of the present invention to provide a process cartridge and an electrophotographic image forming apparatus wherein a coupling mechanism which is in the engagement position when a driving force is to be transmitted, and in the disengagement position when the driving force is not to be transmitted.

It is a further object of the present invention to provide a process cartridge and an electrophotographic image forming apparatus wherein a photosensitive drum can be substantially aligned (centered) when the driving force is transmitted.

It is a further object of the present invention to provide a process cartridge and an electrophotographic image forming apparatus wherein a driving force is transmitted to an electrophotographic photosensitive drum by engagement between a non-twisted projection and a non-twisted hole.

It is a further object of the present invention to provide a process cartridge and an electrophotographic image forming apparatus wherein when a process cartridge is mounted to the main assembly of the apparatus, the process cartridge is correctly positioned in the longitudinal direction of the photosensitive drum.

It is a further object of the present invention to provide a process cartridge and an electrophotographic image forming apparatus wherein an elastic member is provided to urge the process cartridge in the longitudinal direction of a photosensitive drum when a process cartridge is mounted to a main assembly of an apparatus.

These and other objects, features and advantages of the present invention will become more apparent upon consideration of the following description of the preferred embodiments of the present invention taken in conjunction with the accompanying drawings.

DESCRIPTION OF THE PREFERRED EMBODIMENTS

Hereinafter, the embodiments of the present invention will be described with reference to the drawings.

Next, desirable embodiments of the present invention will be described. In the following description, the "widthwise" direction of a process cartridge B means the direction in which the process cartridge B is installed into, or removed from, the main assembly of an image forming apparatus, and coincides with the direction in which a recording medium is conveyed. The "lengthwise" direction of the process cartridge B means a direction which is intersectional with (substantially perpendicular to) the direction in which the process cartridge B is installed into, or removed from, the main assembly 14. It is parallel to the surface of the recording medium, and intersectional with (substantially perpendicular to) the direction in which the recording medium is conveyed. Further, the "left" or "right" means the left or right relative to the direction in which the recording medium is conveyed, as seen from above.

Figure 1:
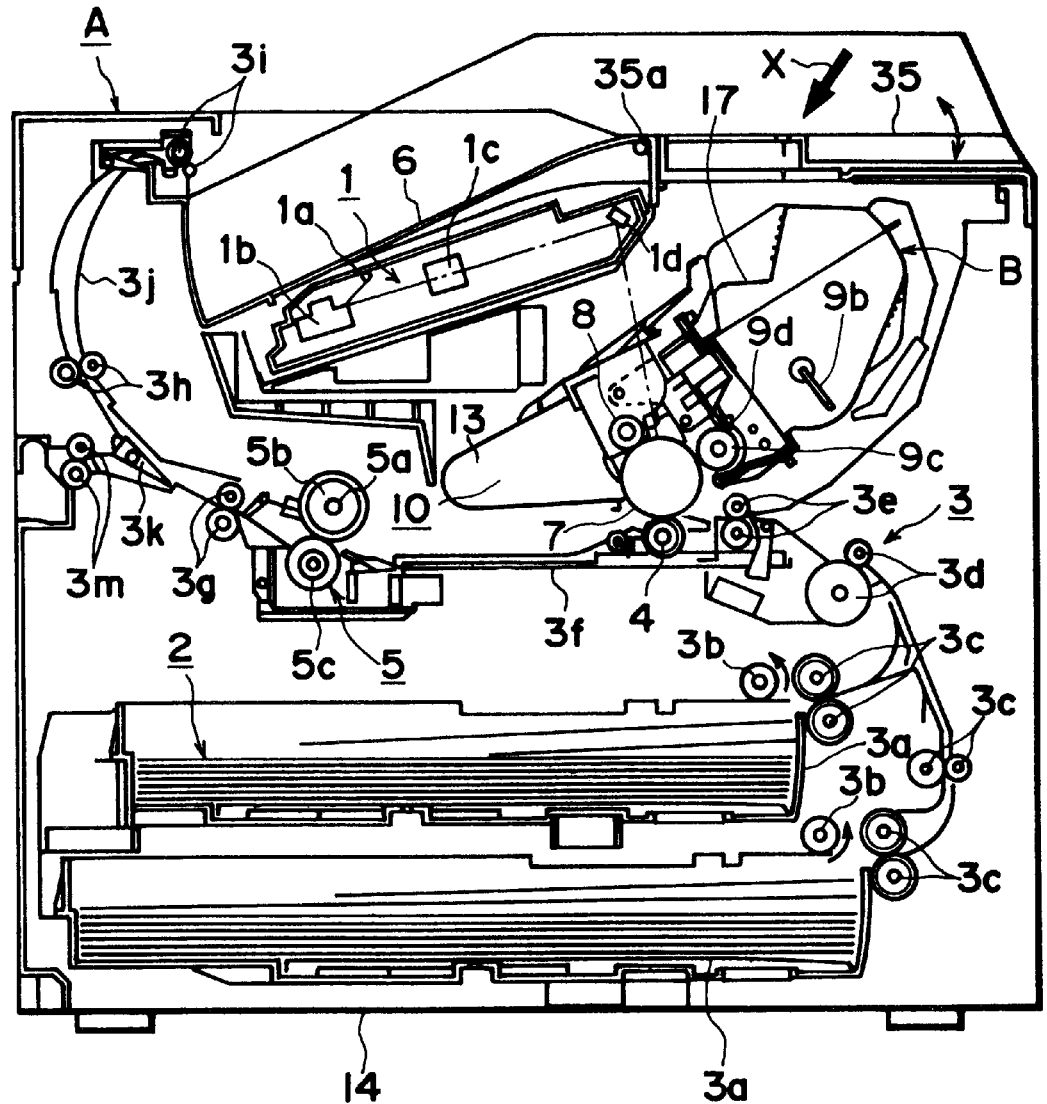
FIG. 1 is a vertical section of an electrophotographic image forming apparatus.
Figure 2:
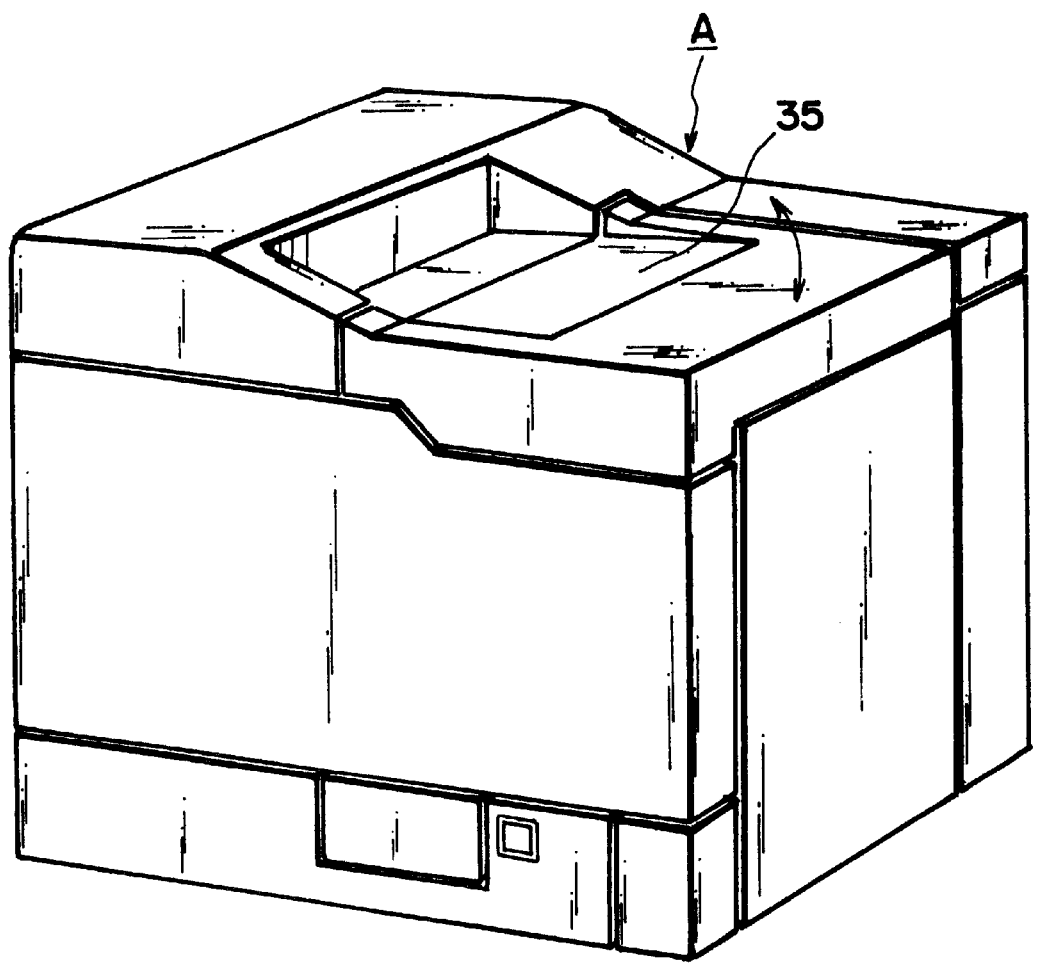
FIG. 2 is an external perspective view of the apparatus illustrated in FIG. 1.
Figure 3:
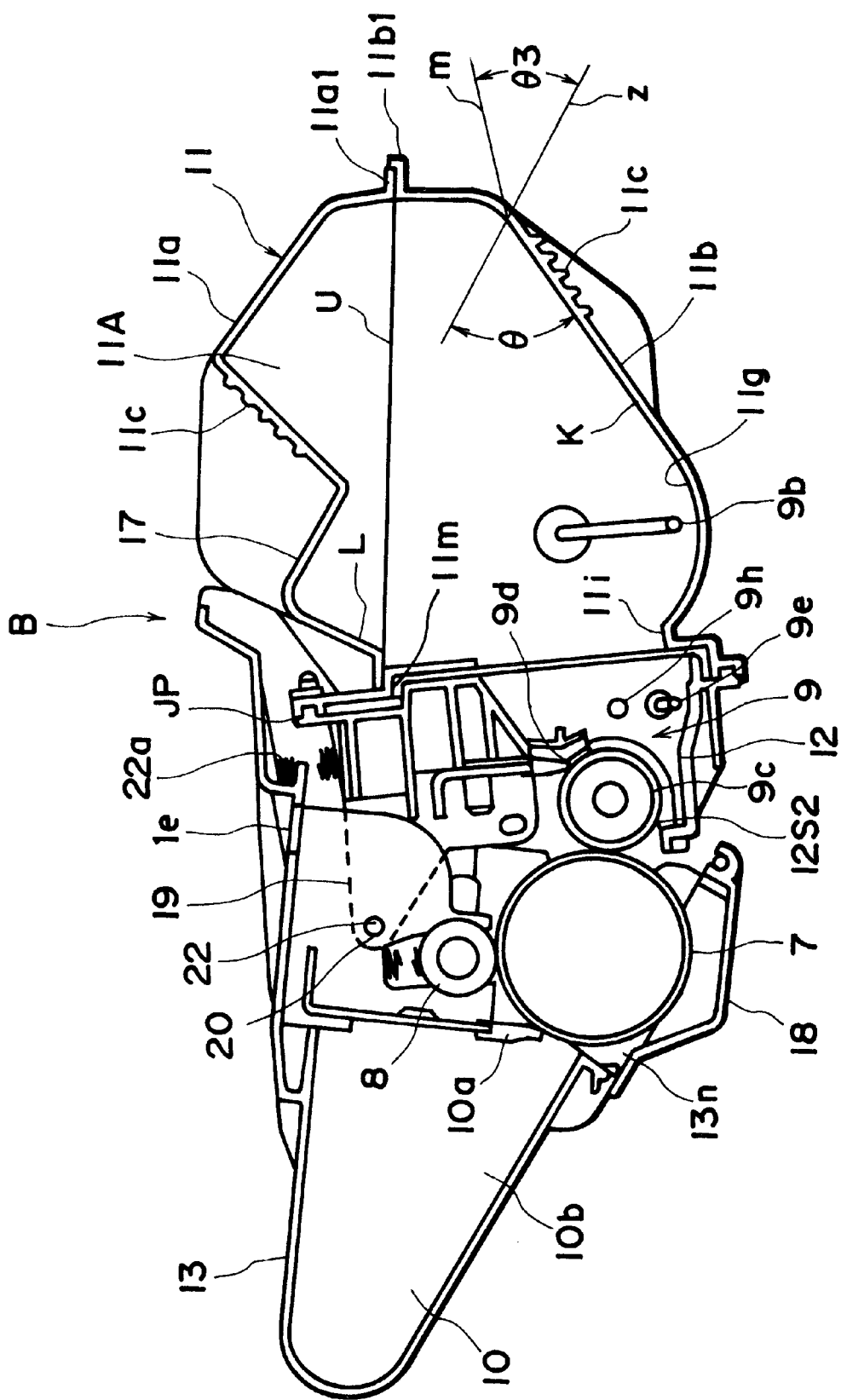
FIG. 3 is a cross-section of a process cartridge.
Figure 4:
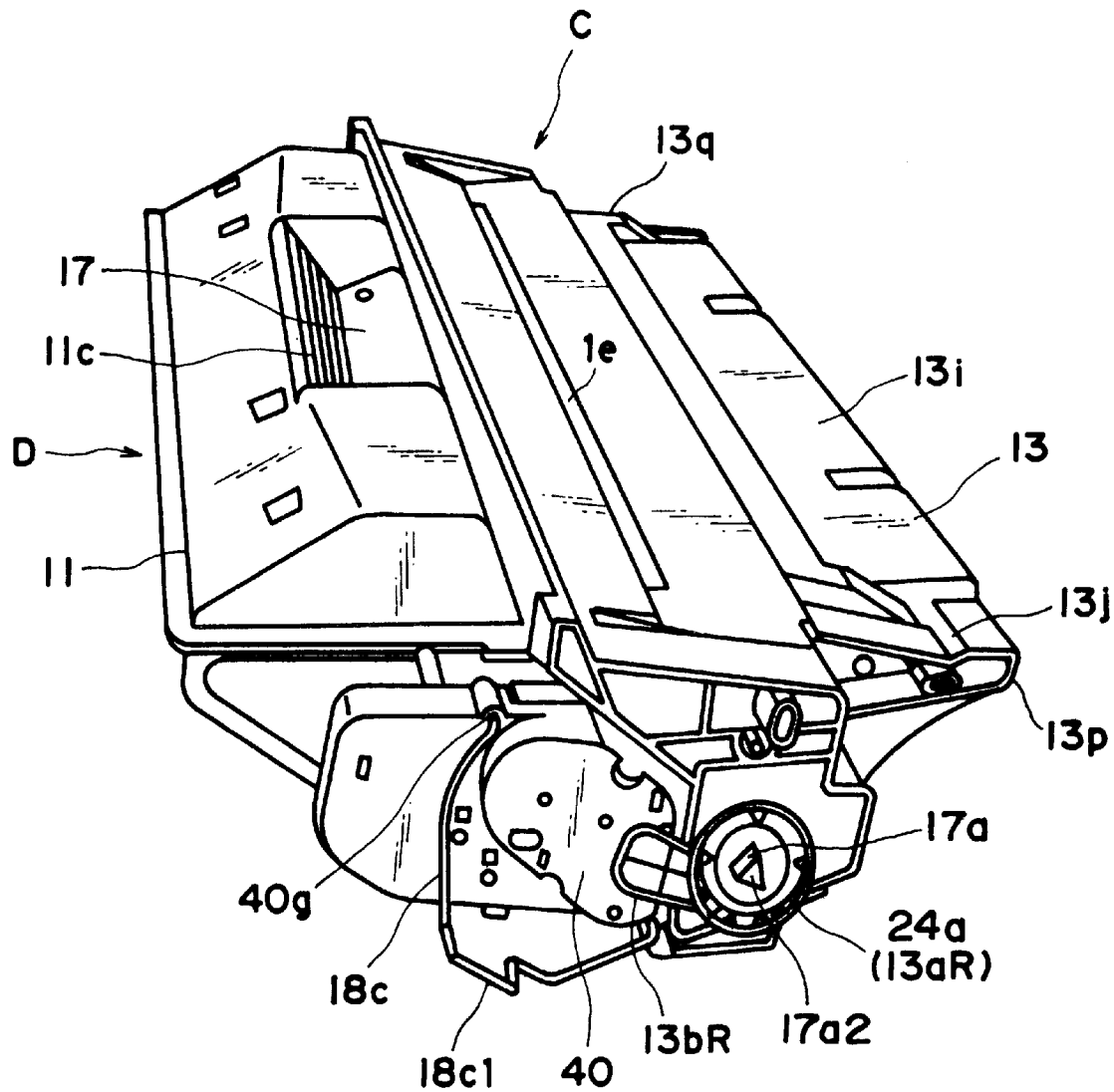
FIG. 4 is an external perspective view of the process cartridge illustrated in FIG. 3, as seen from the top right direction.
Figure 5:
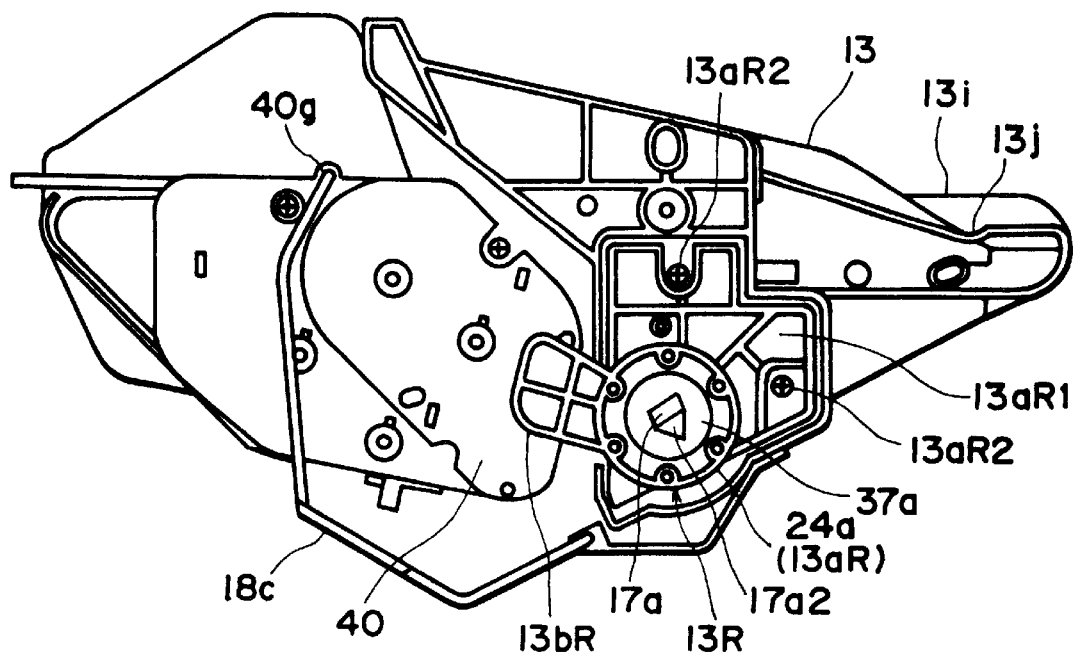
FIG. 5 is the right-hand side view of the process cartridge illustrated in FIG. 3.
Figure 6:
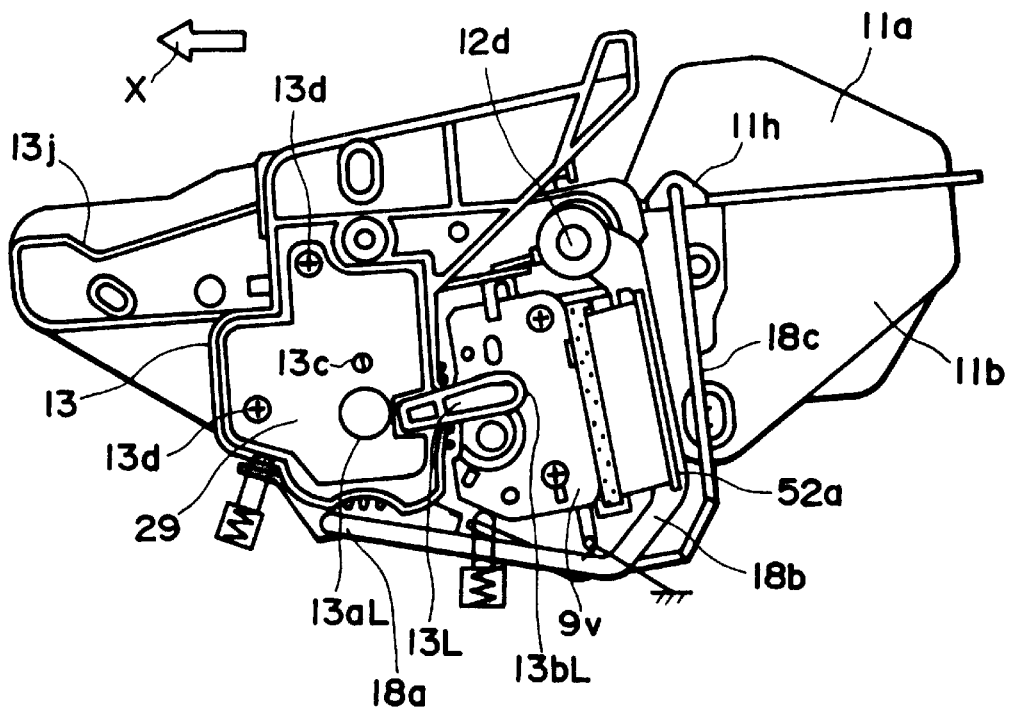
FIG. 6 is the left-hand side view of the process cartridge illustrated in FIG. 3.
Figure 7:
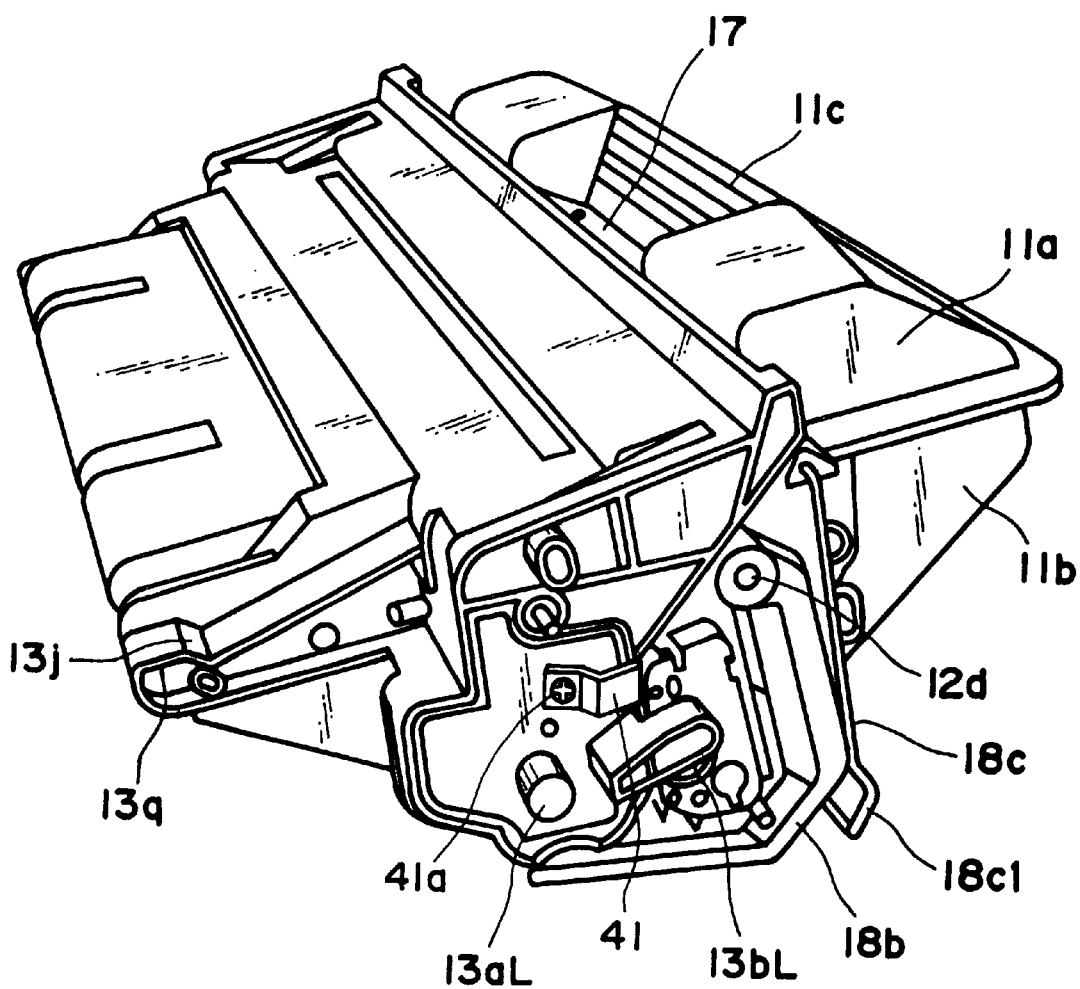
FIG. 7 is an external perspective view of the process cartridge illustrated in FIG. 3, as seen from the top left direction.
Figure 8:
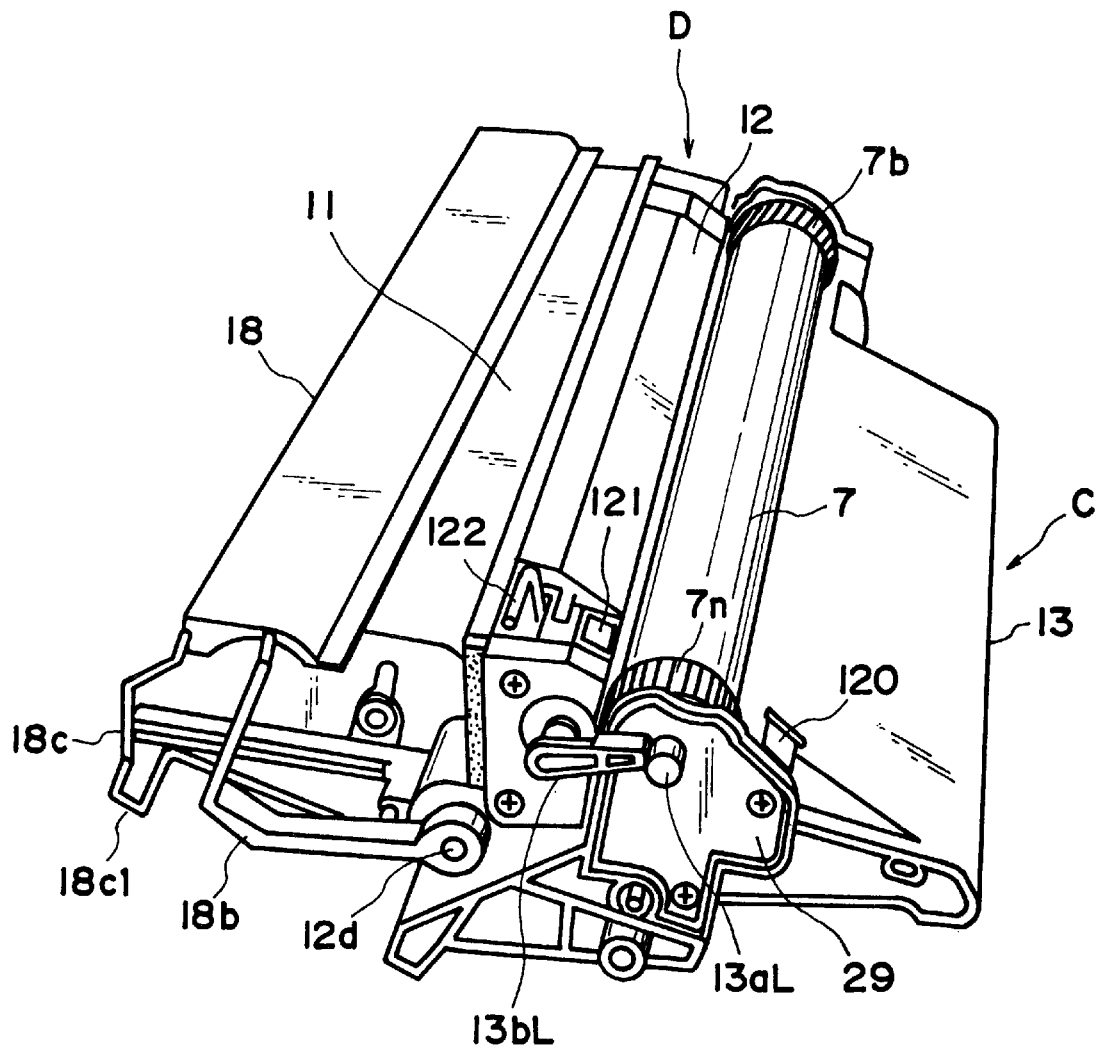
FIG. 8 is an external perspective view of the bottom left side of the process cartridge illustrated in FIG. 3.

FIG. 1 is an electrophotographic image forming apparatus (laser beam printer) which embodies the present invention, depicting the general structure thereof; FIG. 2, an external perspective thereof; and FIGS. 3–8 are drawings of process cartridges which embody the present invention. More specifically, FIG. 3 is a cross-section of a process cartridge; FIG. 4, an external perspective view of the process cartridge; FIG. 5, a right-hand side view of the process cartridge; FIG. 6, a left-hand side view of the process cartridge; FIG. 7, a perspective view of the process cartridge as seen from the top left direction; and FIG. 8 is a perspective view of the process cartridge as seen from the bottom left direction. In the following description, the "top" surface of the process cartridge B means the surface which faces upward when the process cartridge B is in the main assembly 14 of the image forming apparatus, and the "bottom" surface means the surface which faces downward.

(Electrophotographic Image Forming Apparatus A and Process Cartridge B)

First, referring to FIGS. 1 and 2, a laser beam printer A as an electrophotographic image forming apparatus which embodies the present invention will be described. FIG. 3 is a cross-section of a process cartridge which also embodies the present invention.

Referring to FIG. 1, the laser beam printer A is an apparatus which forms an image on a recording medium (for example, recording sheet, OHP sheet, and fabric) through an electrophotographic image forming process. It forms a toner image on an electrophotographic photosensitive drum (hereinafter, photosensitive drum) in the form of a drum. More specifically, the photosensitive drum is charged with the use of a charging means, and a laser beam modulated with the image data of a target image is projected from an optical means onto the charged peripheral surface of the photosensitive drum, forming thereon a latent image in accordance with the image data. This latent image is developed into a toner image by a developing means. Meanwhile, a recording medium 2 placed in a sheet feeding cassette 3a is reversed and conveyed by a pickup roller 3b, conveyer roller pairs 3c and 3d, and register roller pair 3e, in synchronism with the toner formation. Then, a voltage is applied to an image transferring roller 4 as a means for transferring the toner image formed on the photosensitive drum 7 of the process cartridge B, whereby the toner image is transferred onto the recording medium 2. Thereafter, the recording medium 2, onto which the toner image has been transferred, is conveyed to a fixing means 5 by guiding conveyer 3f. The fixing means 5 has a driving roller 5c, and a fixing roller 5b containing a heater 5a, and applies heat and pressure to the recording medium 2 as the recording medium 2 is passed through the fixing means 5, so that the image having been transferred onto the recording medium 2 is fixed to the recording medium 2. Then, the recording medium 2 is conveyed farther, and is discharged into a delivery tray 6 through a reversing path 3j, by discharging roller pairs 3g, 3h and 3i. The delivery tray 6 is located at the top of the main assembly 14 of the image forming apparatus A. It should be noted here that a pivotable flapper 3k may be operated in coordination with a discharge roller pair 3m to discharge the recording medium 2 without passing it through the reversing path 3j. The pickup roller 3b, conveyer roller pairs 3c and 3d, register roller pair 3e, guiding conveyer 3f, discharge roller pairs 3g, 3h and 3i, and discharge roller pair 3m constitute a conveying means 3.

Referring to FIGS. 3–8, in the process cartridge B, on the other hand, the photosensitive drum 7 with a photosensitive layer 7e (FIG. 11) is rotated to uniformly charge its surface by applying voltage to the charging roller 8 as a photosensitive drum charging means. Then, a laser beam modulated with the image data is projected onto the photosensitive drum 7 from the optical system 1 through an exposure opening 1e, forming a latent image on the photosensitive drum 7. The thus formed latent image is developed with the use of toner and the developing means 9. More specifically, the charging roller 8 is disposed in contact with the photosensitive drum 7 to charge the photosensitive drum 7. It is rotated by the rotation of the photosensitive drum 7. The developing means 9 provides the peripheral surface area (area to be developed) of the photosensitive drum 7 with toner so that the latent image formed on the photosensitive drum 7 is developed. The optical system 1 comprises a laser diode 1a, a polygon mirror 1b, a lens 1c, and a deflective mirror 1d.

In the developing means 9, the toner contained in a toner container 11A is delivered to a developing roller 9c by the rotation of a toner feeding member 9b. The developing roller 9c contains a stationary magnet. It is also rotated so that a layer of toner with triboelectric charge is formed on the peripheral surface of the developing roller 9c. The image developing area of the photosensitive drum 7 is provided with the toner from this toner layer, the toner is transferred onto the peripheral surface of the photosensitive drum 7 in a manner to reflect the latent image, visualizing the latent image as a toner image. A developing blade 9d is a blade which regulates the amount of the toner adhered to the peripheral surface of the developing roller 9c and also triboelectrically charges the toner. Adjacent to the developing roller 9e, a toner stirring member 9c is rotatively disposed to circulatively stir the toner within the image developing chamber.

After the toner image formed on the photosensitive drum 7 is transferred onto the recording medium 2 by applying a voltage with a polarity opposite to that of the toner image to the image transferring roller 4, the residual toner on the photosensitive drum 7 is removed by the cleaning means 10. The cleaning means 10 comprises an elastic cleaning blade 10a disposed in contact with the photosensitive drum 7, and the toner remaining on the photosensitive drum 7 is scraped off by the elastic cleaning blade 10a, being collected into a waste toner collector 10b.

The process cartridge B is formed in the following manner. First, a toner chamber frame 11 which comprises a toner container (toner storing portion) 11A for storing toner is joined with an image developing chamber frame 12 which houses the image developing means 9 such as an image developing roller 9c, and then, a cleaning chamber frame 13, in which the photosensitive drum 7, the cleaning means 10 such as the cleaning blade 10a, and the charging roller 8 are mounted, is joined with the preceding two frames 11 and 12 to complete the process cartridge B. The thus formed process cartridge B is removably installable into the main assembly 14 of the image forming apparatus A.

The process cartridge B is provided with an exposure opening through which a light beam modulated with image data is projected onto the photosensitive drum 7, and a transfer opening 13n through which the photosensitive drum 7 opposes the recording medium 2. The exposure opening 1e is a part of the cleaning chamber frame 13, and the transfer opening 13n is located between the image developing chamber frame 12 and the cleaning chamber frame 13.

Next, the structure of the housing of the process cartridge B in this embodiment will be described.

The process cartridge in this embodiment is formed in the following manner. First the toner chamber frame 11 and the image developing chamber frame 12 are joined, and then, the cleaning chamber frame 13 is rotatively joined with the preceding two frames 11 and 12 to complete the housing. In this housing, the aforementioned photosensitive drum 7, charging roller 8, developing means 9, cleaning means 10, and the like, are mounted to complete the process cartridge B. The thus formed process cartridge B is removably installable into the cartridge accommodating means provided in the main assembly 14 of an image forming apparatus.

(Housing Structure of Process Cartridge B)

As described above, the housing of the process cartridge B in this embodiment is formed by joining the toner chamber frame 11, the image developing chamber frame 12, and the cleaning chamber frame 13. Next, the structure of the thus formed housing will be described.

Figure 13:
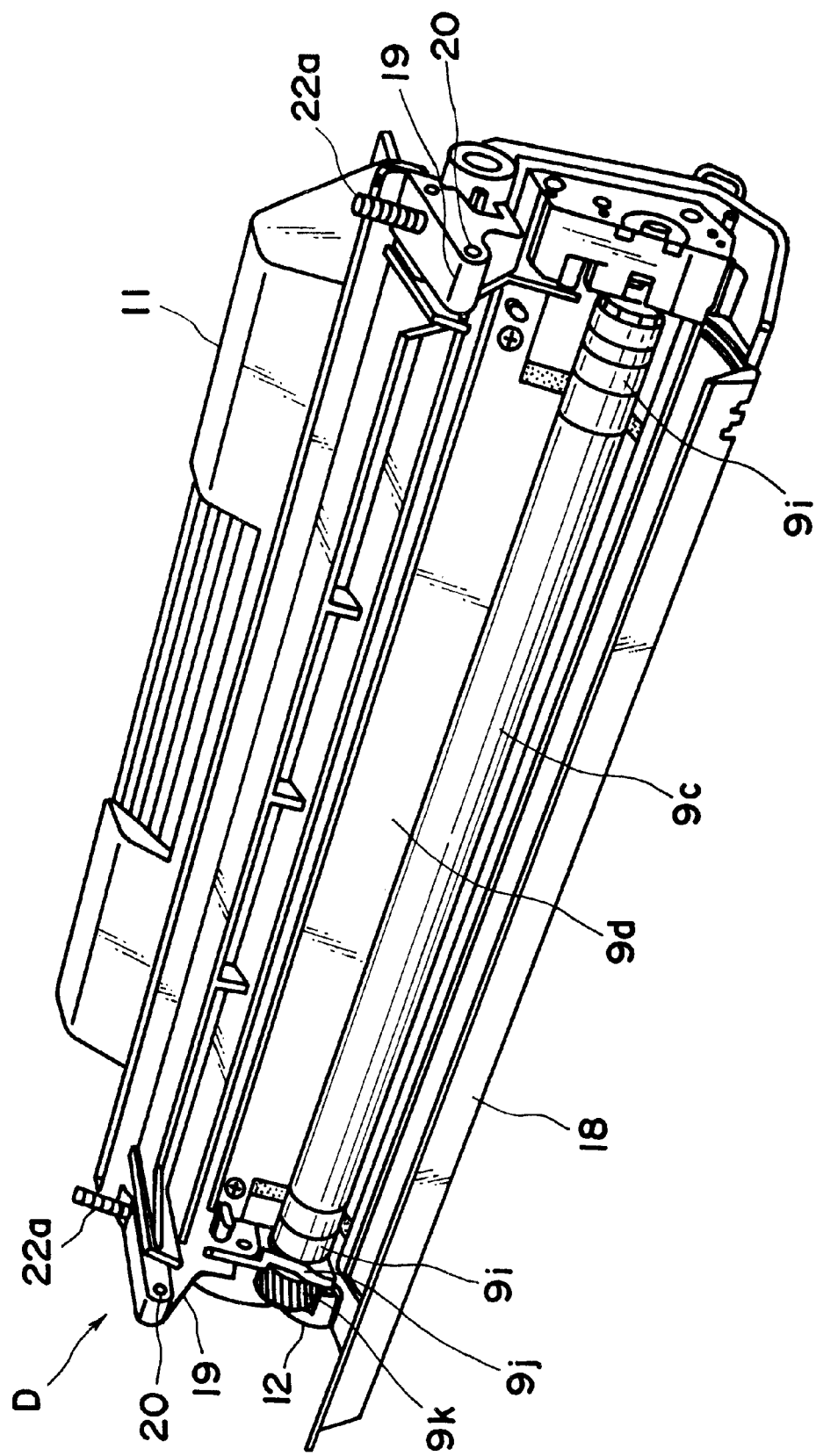
FIG. 13 is a perspective view of an image developing unit.

Referring to FIGS. 3 and 13, in the toner chamber frame 11, the toner feeding member 9b is rotatively mounted. In the image developing chamber frame 12, the image developing roller 9c and the developing blade 9d are mounted, and adjacent to the developing roller 9e, the stirring member 9c is rotatively mounted to circulatively stir the toner within the image developing chamber. Referring to FIG. 3, in the image developing chamber frame 12, a rod antenna 9h is mounted, extending in the lengthwise direction of the developing roller 9c substantially in parallel to the developing roller 9c. The toner chamber frame 11 and the developing chamber frame 12, which are equipped in the above-described manner, are welded together (in this embodiment, by ultrasonic wave) to form a second frame which constitutes an image developing unit D (FIG. 13).

The image developing unit of the process cartridge B is provided with a drum shutter assembly 18, which covers the photosensitive drum 7 to prevent it from being exposed to light for an extended period of time or from coming in contact with foreign objects when or after the process cartridge B is removed from the main assembly 14 of an image forming apparatus.

Referring to FIG. 6, the drum shutter assembly 18 has a shutter cover 18a which covers or exposes the transfer opening 13n illustrated in FIG. 3, and linking members 18b and 18c which support the shutter cover 18. On the upstream side relative to the direction in which the recording medium 2 is conveyed, one end of the right-hand side linking member 18c is fitted in a hole 40g of a developing means gear holder 40 as shown in FIGS. 4 and 5, and one end of the left-hand side linking member 18c is fitted in a boss 11h of the bottom portion 11b of the toner chamber frame 11. The other ends of the leftand right-hand linking members 18c are attached to the corresponding lengthwise ends of the shutter cover 18a, on the upstream side relative to the recording medium conveying direction. The linking member 18c is made of metallic rod. Actually, the left- and right-hand linking members 18c are connected through the shutter cover 18a; in other words, the left- and right-hand linking members 18c are the left- and right-hand ends of a single piece linking member 18c. The linking member 18b is provided only on one lengthwise end of the shutter cover 18a. One end of the linking member 18b is attached to the shutter cover 18a, on the downstream side, relative to the recording medium conveying direction, of the position at which the linking member 18c is attached to the shutter cover 18a, and the other end of the linking member 18b is fitted around a dowel 12d of the image developing chamber frame 12. The linking member 18b is formed of synthetic resin.

The linking members 18b and 18c, which are different in length, form a four piece linkage structure in conjunction with the shutter cover 18a and the toner chamber frame 11. As the process cartridge B is inserted into an image forming apparatus, the portion 18cl of the linking member 18c, which projects away from the process cartridge B, comes in contact with the stationary contact member (unillustrated) provided on the lateral wall of the cartridge accommodating space S of the main assembly 14 of the image forming apparatus, and activates the drum shutter assembly 18 to open the shutter cover 18a.

The drum shutter assembly 18 constituted of the shutter cover 18a and the linking members 18b and 18c is loaded with pressure from an unillustrated torsional coil spring fitted around a dowel 12d. One end of the spring is anchored to the linking member 18b, and the other end is anchored to the image developing chamber frame 12, so that the pressure is generated in the direction to cause the shutter cover 18a to cover the transfer opening 13n.

Referring again to FIGS. 3 and 12, the cleaning chamber frame 13 is fitted with the photosensitive drum 7, the charging roller 8, and the various components of the cleaning means 10, to form a first frame as a cleaning unit C (FIG. 12).

Figure 12:
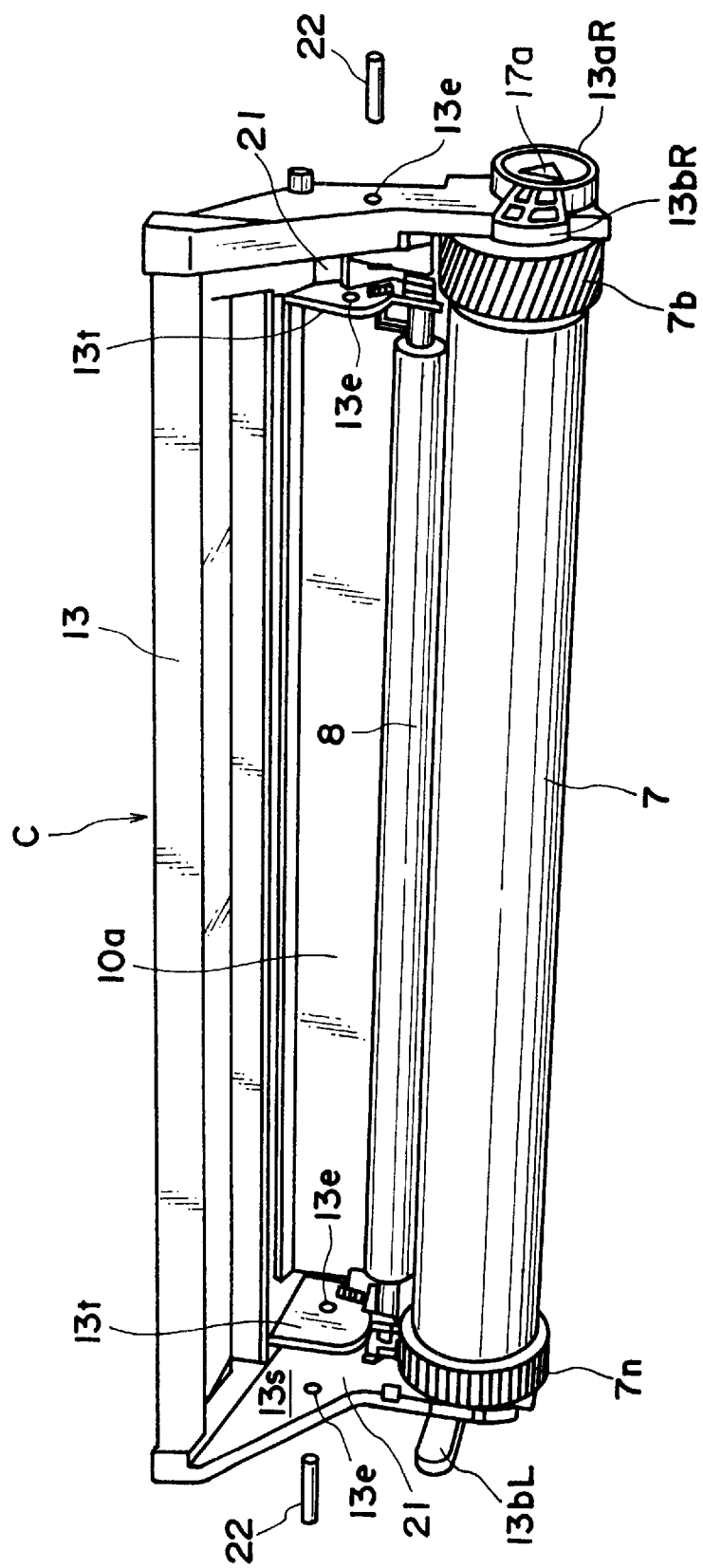
FIG. 12 is a perspective view of a cleaning unit.

Then, the aforementioned image developing unit D and cleaning unit C are joined with the use of a joining member 22, in a mutually pivotable manner, to complete the process cartridge B. More specifically, referring to FIG. 13, both lengthwise (axial direction of the developing roller 9c) ends of the image developing chamber frame 12 are provided with an arm portion 19, which is provided with a round hole 20 with an axis parallel to the developing roller 9c. On the other hand, a recessed portion 21 for accommodating the arm portion 19 is provided at each lengthwise end of the cleaning chamber frame (FIG. 12). The arm portion 19 is inserted in this recessed portion 21, and the joining member 22 is pressed into the mounting hole 13e of the cleaning chamber frame 13, put through the hole 20 of the end portion of the arm portion 19, and pressed, farther, into the hole 13e of a partitioning wall 13t, so that the image developing unit D and the cleaning unit C are joined to be pivotable relative to each other about the joining member 22. In joining the image developing unit D and the cleaning unit C, a compression type coil spring 22a is placed between the two units, with one end of the coil spring being fitted around an unillustrated dowel erected from the base portion of the arm portion 19, and the other end being pressed against the top wall of the recessed portion 21 of the cleaning chamber frame 13. As a result, the image developing chamber frame 12 is pressed downward to reliably keep the developing roller 9c pressed downward toward the photosensitive drum 7. More specifically, referring to FIG. 13, a roller 9i having a diameter larger than that of the developing roller 9c is attached to each lengthwise end of the developing roller 9c, and this roller 9i is pressed on the photosensitive drum 7 to maintain a predetermined gap (approximately 300 μm) between the photosensitive drum 7 and the developing roller 9c. The top surface of the recessed portion 21 of the cleaning chamber frame 13 is slanted so that the compression type coil spring 22a is gradually compressed when the image developing unit D and the cleaning unit C are united. That is, the image developing unit D and the cleaning unit C are pivotable toward each other about the joining member 22, wherein the positional relationship (gap) between the peripheral surface of the photosensitive drum 7 and the peripheral surface of the developing roller 9c is precisely maintained by the elastic force of the compression type coil spring 22a.

Since the compression type coil spring 22a is attached to the base portion of the arm portion 19 of the image developing chamber frame 12, the elastic force of the compression type coil spring 22a affects only the base portion of the arm portion 19. In a case in which the image developing chamber frame 12 is provided with a dedicated spring mount for the compression type coil spring 22a, the adjacencies of the spring seat must be reinforced to precisely maintain the predetermined gap between the photosensitive drum 7 and the developing roller 9c. However, with the placement of the compression type coil spring 22a in the above described manner, it is unnecessary to reinforce the adjacencies of the spring seat, that is, the adjacencies of the base portion of the arm portion 19 in the case of this embodiment, because the base portion of the arm portion 19 is inherently greater in strength and rigidity.

The above described structure which holds together the cleaning chamber frame 13 and the image developing chamber frame 12 will be described later in more detail.

(Structure of Process Cartridge B Guiding Means)

Figure 9:
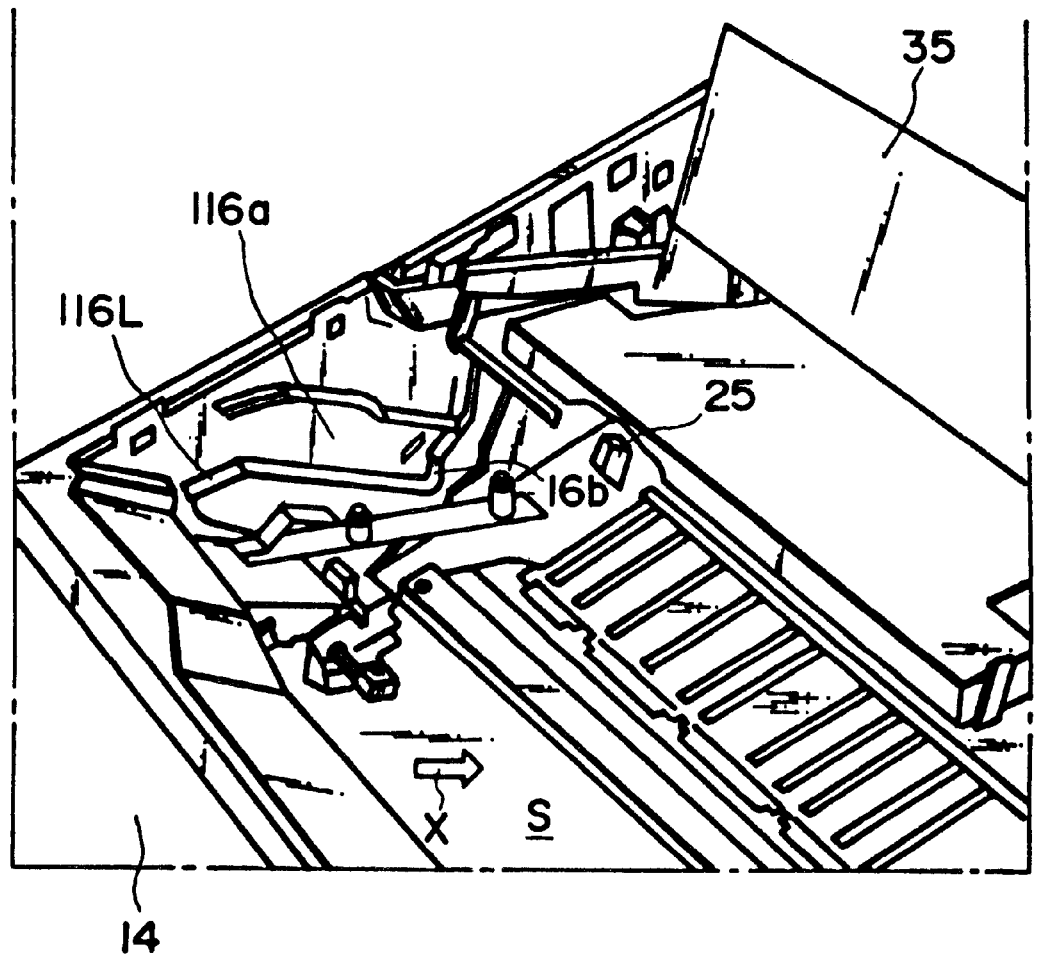
FIG. 9 is an external perspective view of the process cartridge accommodating portion of the main assembly of the apparatus illustrated in FIG. 1.
Figure 10:
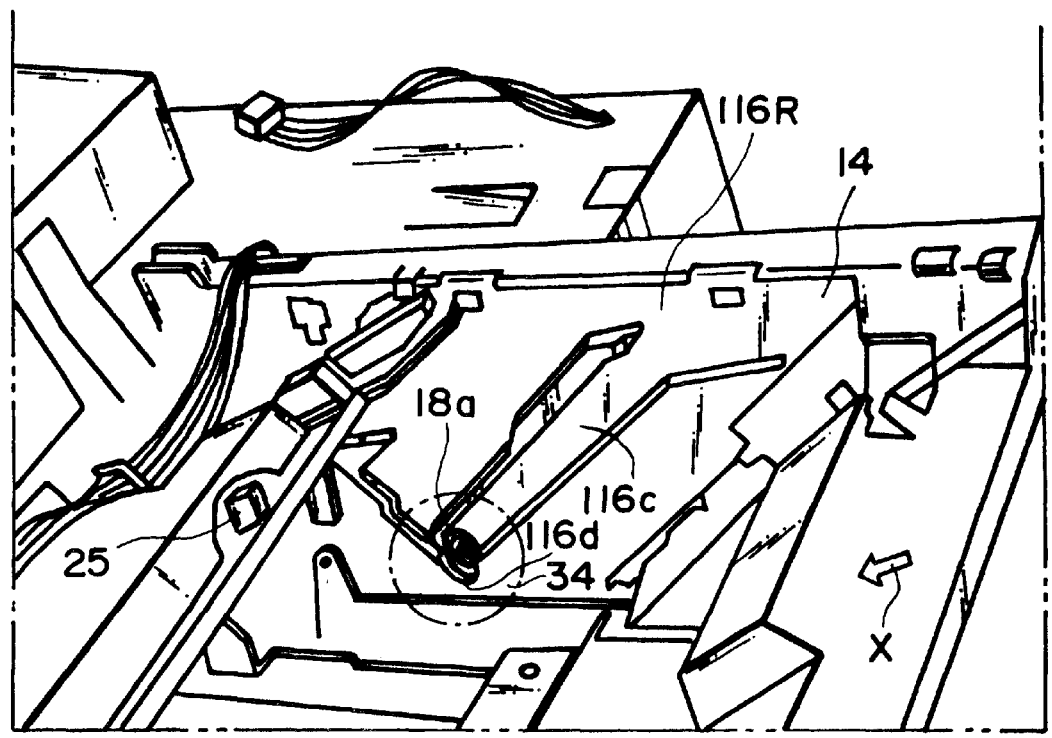
FIG. 10 is an external perspective view of the process cartridge accommodating portion of the main assembly of the apparatus illustrated in FIG. 1.

Next, the means for guiding the process cartridge B when the process cartridge B is installed into, or removed from, the main assembly 14 of an image forming apparatus will be described. This guiding means is illustrated in FIGS. 9 and 10. FIG. 9 is a perspective view of the left-hand side of the guiding means, as seen (in the direction of an arrow mark X) from the side from which the process cartridge B is installed into the main assembly 14 of the image forming apparatus A (as seen from the side of the image developing unit D side). FIG. 10 is a perspective view of the right-hand side of the same, as seen from the same side.

Referring to FIGS. 4, 5, 6 and 7, each lengthwise end of the cleaning chamber frame 13 is provided with means which serves as a guide when the process cartridge B is installed into, or removed from, the apparatus main assembly 14. This guiding means is constituted of cylindrical guides 13aR and 13aL as a cartridge positioning guiding member, and rotation controlling guides 13bR and 13bL as means for controlling the attitude of the process cartridge B when the process cartridge B is installed or removed.

As illustrated in FIG. 5, the cylindrical guide 13aR is a hollow cylindrical member. The rotation controlling guide 13bR is integrally formed together with the cylindrical guide 13aR, and radially protrudes from the peripheral surface of the cylindrical guide 13aR. The cylindrical guide 13aR is provided with a mounting flange 13aR1 which is also integral with the cylindrical guide 13aR. Thus, the cylindrical guide 13aR, the rotation controlling guide 13bR, and the mounting flange 13aR1 constitute the right-hand side guiding member 13R, which is fixed to the cleaning chamber frame 13 with small screws put through the screw holes of the mounting flange 13aR1. With the right-hand side guiding member 13R being fixed to the cleaning chamber frame 13, the rotation controlling guide 13bR extends over the lateral wall of the developing means gear holder 40 fixed to the image developing chamber frame 12.

Figure 11:
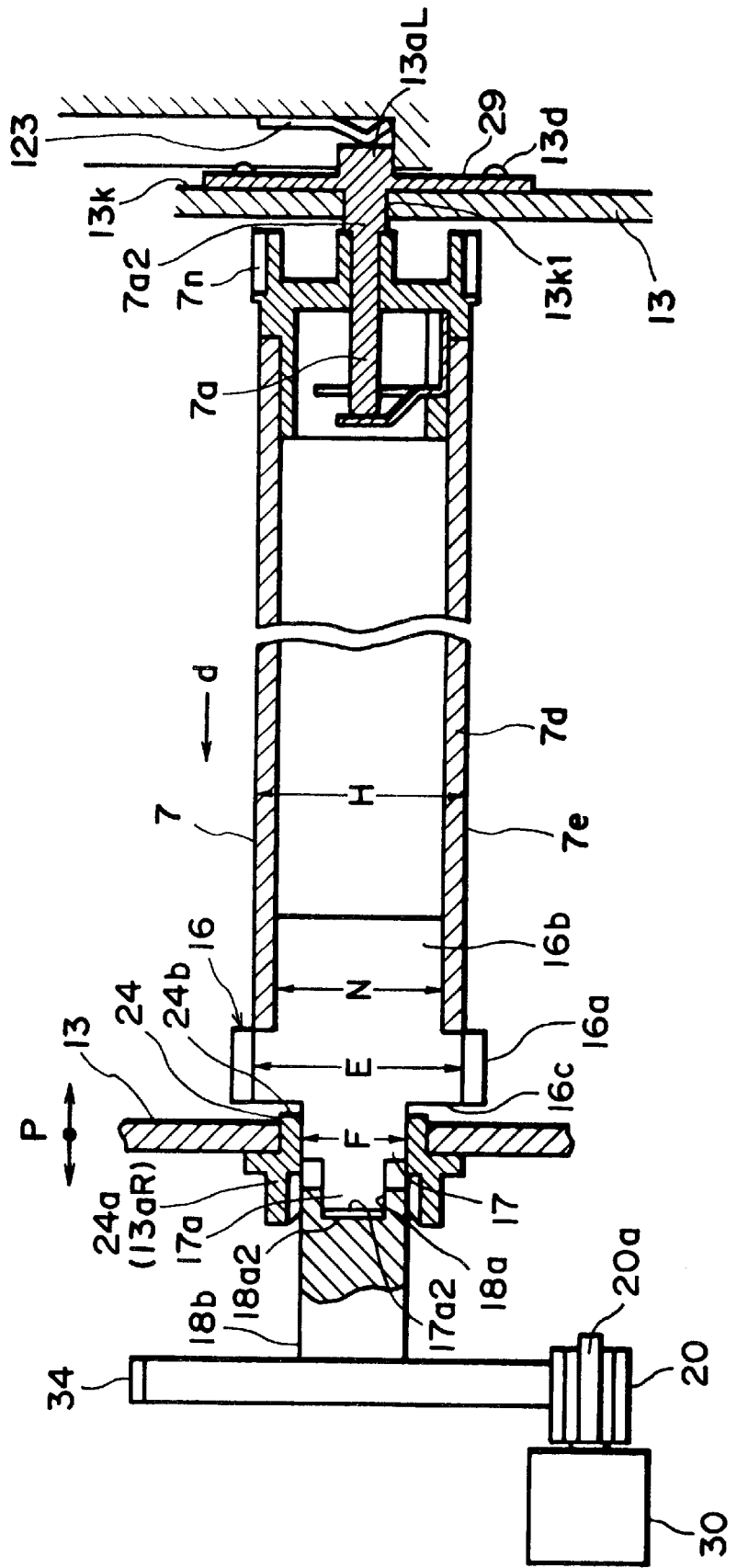
FIG. 11 is a vertical section of a photosensitive drum and a driving mechanism for driving the photosensitive drum.

Referring to FIG. 11, a drum shaft member is constituted of a drum shaft portion 7a inclusive of a larger diameter portion 7a2, a disk-shaped flange portion 29 and a cylindrical guide portion 13aL. The larger diameter portion 7a2 is fitted in the hole 13kl of the cleaning chamber frame 13. The flange portion 29 is engaged with a positioning pin 13c projecting from the side wall of the lengthwise end wall of the cleaning chamber frame 13, thus being prevented from rotating, and is fixed to the cleaning chamber frame 13 with the use of small screws 13d. The cylindrical guide portion 13aL projects outward (toward front, that is, the direction perpendicular to the page of FIG. 6). The aforementioned stationary drum shaft 7a which rotatively supports a spur gear 7n fitted around the photosensitive drum 7 projects inwardly from the flange 29 (FIG. 11). The cylindrical guide portion 13aL and the drum shaft 7a are coaxial. The flange 29, the cylindrical guide portion 13aL, and the drum shaft 7a, are integrally formed of metallic material such as steel.

Referring to FIG. 6, there is a rotation controlling guide 13bL slightly away from the cylindrical guide 13aL. It is long and narrow, extending substantially in the radial direction of the cylindrical guide 13aL and also projecting outward from the cleaning chamber frame 13. It is integrally formed with the cleaning chamber frame 13. In order to accommodate this rotation controlling guide 13bL, the flange 29 is provided with a cutaway portion. The distance the rotation controlling guide 13bL projects outward is such that its end surface is substantially even with the end surface of the cylindrical guide 13aL. The rotation controlling guide 13bL extends over the side wall of the developing roller bearing box 9v fixed to the image developing chamber frame 12. As is evident from the above description, the left-hand side guiding member 13L is constituted of two separate pieces: the metallic cylindrical guide 13aL and the rotation controlling guide 13bL of synthetic resin.

Next, a regulatory contact portion 13j, which is a part of the top surface of the cleaning chamber frame 13, will be described. In the following description of the regulatory contact portion 13j, "top surface" means the surface which faces upward when the process cartridge B is in the main assembly 14 of an image forming apparatus.

Referring to FIGS. 4–7, two portions 13j of the top surface 13i of the cleaning unit C, which are the portions right next to the right and left front corners 13p and 13q, relative to the direction perpendicular to the direction in which the process cartridge B is inserted, constitute the regulatory contact portions 13j, which regulate the position and attitude of the process cartridge B when the cartridge B is installed into the main assembly 14. In other words, when the process cartridge B is installed into the main assembly 14, the regulatory contact portion 13j comes in contact with the fixed contact member 26 provided in the main assembly 14 of an image forming apparatus (FIGS. 9 and 10), and regulates the rotation of the process cartridge B about the cylindrical guide 13aR and 13aL.

Next, the guiding means on the main assembly side will be described. Referring to FIG. 1, as the lid 35 of the main assembly 14 of an image forming apparatus is pivotally opened about a supporting point 35a in the counterclockwise direction, the top portion of the main assembly 14 is exposed, and the process cartridge accommodating portion appears as illustrated in FIGS. 9 and 10. The left and right internal walls of the image forming apparatus main assembly 14, relative to the direction in which the process cartridge B is inserted, are provided with guide members 116L (FIG. 9) and 116R (FIG. 10), respectively, which extend diagonally downward from the side opposite to the supporting point 35a.

As shown in the drawings, the guide members 116L and 116R comprise guide portions 116a and 116c, and positioning grooves 116b and 116d connected to the guide portions 116a and 116c, respectively. The guide portions 116a and 116c extend diagonally downward, as seen from the direction indicated by an arrow mark X, that is, the direction in which the process cartridge B is inserted. The positioning grooves 116b and 116d have a semicircular cross-section which perfectly matches the cross-section of the cylindrical guides 13aL or 13aR of the process cartridge B. After the process cartridge B is completely installed in the apparatus main assembly 14, the centers of semicircular cross-sections of the positioning grooves 116b and 116d coincide with the axial lines of the cylindrical guides 13aL and 13aR, respectively, of the process cartridge B, and hence, with the axial line of the photosensitive drum 7.

The width of the guide portions 116a and 116c as seen from the direction in which the process cartridge B is installed or removed is wide enough to allow the cylindrical guides 13aL and 13aR to ride on them with a reasonable amount of play. Therefore, the rotation controlling guides 13bL and 13bR which are narrower than the diameter of the cylindrical guide 13aL and 13aR naturally fit more loosely in the guide portions 116a and 116c than the cylindrical guides 13aL and 13aR, respectively, yet their rotation is controlled by the guide portions 116a and 116c. In other words, when the process cartridge B is installed, the angle of the process cartridge B is kept within a predetermined range. After the process cartridge B is installed in the image forming apparatus main assembly 14, the cylindrical guides 13aL and 13aR of the process cartridge B are in engagement with the positioning grooves 116b and 116d of the guiding members 13L and 13R, and the left and right regulatory contact portions 13j located at the front portion, relative to the cartridge inserting direction, of the cleaning chamber frame 13 of the process cartridge B, are in contact with the fixed positioning members 26, respectively.

The weight distribution of the process cartridge B is such that when the line which coincides with the axial lines of the cylindrical guide 13aL and 13aR is level, the image developing unit D side of the process cartridge B generates larger moment about this line than the cleaning unit C side.

The process cartridge B is installed into the image forming apparatus main assembly 14 in the following manner. First, the cylindrical guides 13aL and 13aR of the process cartridge B are inserted into the guide portions 116a and 116c, respectively, of the cartridge accommodating portion in the image forming apparatus main assembly 14 by grasping the recessed portion 11d and ribbed portion 11c of the process cartridge B with one hand, and the rotation controlling guide 13bL and 13bR are also inserted into the guide portions 116a and 116c, tilting downward the front portion, relative to the inserting direction, of the process cartridge B. Then, the process cartridge B is inserted farther with the cylindrical guides 13aL and 13aR and the rotation controlling guides 13bL and 13bR of the process cartridge B following the guide portions 116a and 116c, respectively, until the cylindrical guides 13aL and 13aR reach the positioning grooves 116b and 116d of the image forming apparatus main assembly 14. Then, the cylindrical guides 13aL and 13aR become seated in the positioning grooves 116b and 116d, respectively, due to the weight of the process cartridge B itself; the cylindrical guides 13aL and 13aR of the process cartridge B are accurately positioned relative to the positioning grooves 116b and 116d. In this condition, the line which coincides with the axial lines of the cylindrical guides 13aL and 13aR also coincides with the axial line of the photosensitive drum 7, and therefore, the photosensitive drum 7 is reasonably accurately positioned relative to the image forming apparatus main assembly 14. It should be noted here that the final positioning of the photosensitive drum 7 relative to the image forming apparatus main assembly 14 occurs at the same time as the coupling between the two is completed.

Also in this condition, there is a slight gap between the stationary positioning member 26 of the image forming apparatus main assembly 14 and the regulatory contact portion 13j of the process cartridge B. At this point of time, the process cartridge B is released from the hand. Then, the process cartridge B rotates about the cylindrical guides 13aL and 13aR in the direction to lower the image developing unit D side and raise the cleaning unit C side until the regulatory contact portions 13j of the process cartridge B come in contact with the corresponding stationary positioning members 26. As a result, the process cartridge B is accurately positioned relative to the image forming apparatus main assembly 14. Thereafter, the lid 35 is closed by rotating it clockwise about the supporting point 35a.

In order to remove the process cartridge B from the apparatus main assembly 14, the above described steps are carried out in reverse. More specifically, first, the lid 35 of the apparatus main assembly 14 is opened, and the process cartridge B is pulled upward by grasping the aforementioned top and bottom ribbed portions 11c, that is, the handhold portions, of the process cartridge by hand. Then, the cylindrical guides 13aL and 13aR of the process cartridge B rotate in the positioning grooves 116b and 116d of the apparatus main assembly 14. As a result, the regulatory contact portions 13j of the process cartridge B separate from the corresponding stationary positioning member 26. Next, the process cartridge B is pulled more. Then, the cylindrical guides 13aL and 13aR come out of the positioning grooves 116b and 116d, and move into the guide portions 116a and 116c of the guiding member 116L and 116R, respectively, fixed to the apparatus main assembly 14. In this condition, the process cartridge B is pulled more. Then, the cylindrical guides 13aL and 13aR and the rotation controlling guides 13bL and 13bR of the process cartridge B slide diagonally upward through the guide portions 116a and 116c of the apparatus main assembly 14, with the angle of the process cartridge B being controlled so that the process cartridge B can be completely moved out of the apparatus main assembly 14 without making contact with the portions other than the guide portions 116a and 116c.

Referring to FIG. 12, the spur gear 7n is fitted around one of the lengthwise ends of the photosensitive drum 7, which is the end opposite to where the helical drum gear 7b is fitted. As the process cartridge B is inserted into the apparatus main assembly 14, the spur gear 7n meshes with a gear (unillustrated) coaxial with the image transferring roller 4 located in the apparatus main assembly, and transmits from the process cartridge B to the transferring roller 4 the driving force which rotates the transferring roller 4.

(Coupling and Driving Structure)

The description will be made as to the structure of the shaft coupling apparatus which is a drive transmission mechanism from the main assembly of the image forming apparatus to the process cartridge.

Figure 14:
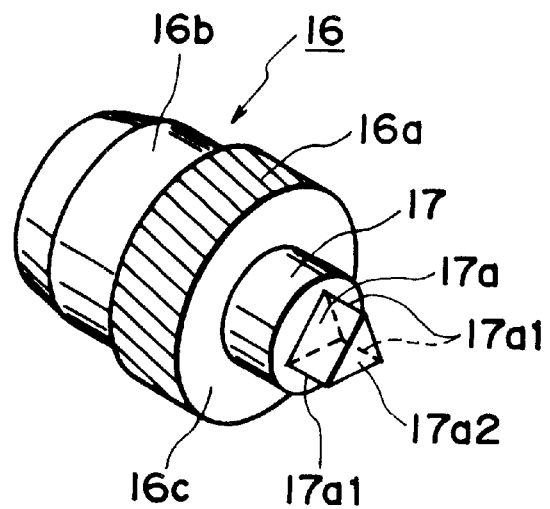
FIG. 14 is a perspective view of a drum flange (driving force transmitting part) according to a first embodiment.
Figure 15:
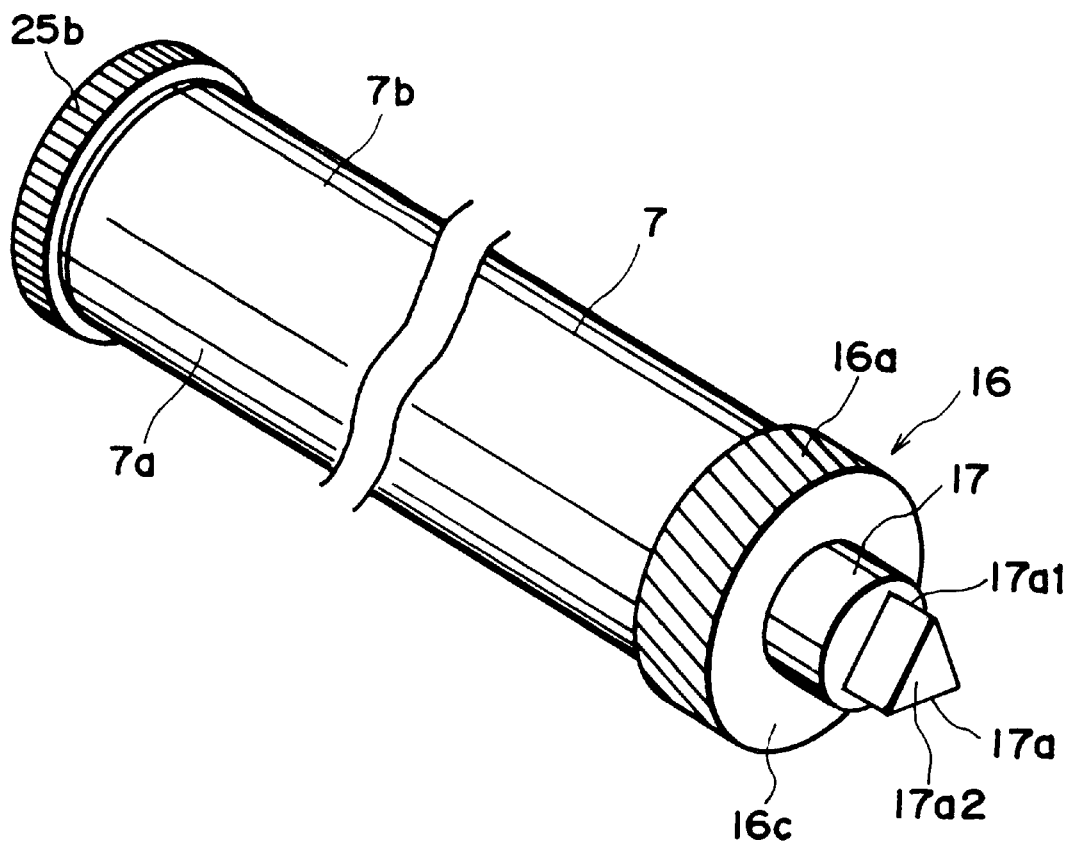
FIG. 15 is a perspective view of a photosensitive drum according to Embodiment 1 of the present invention.
Figure 16:
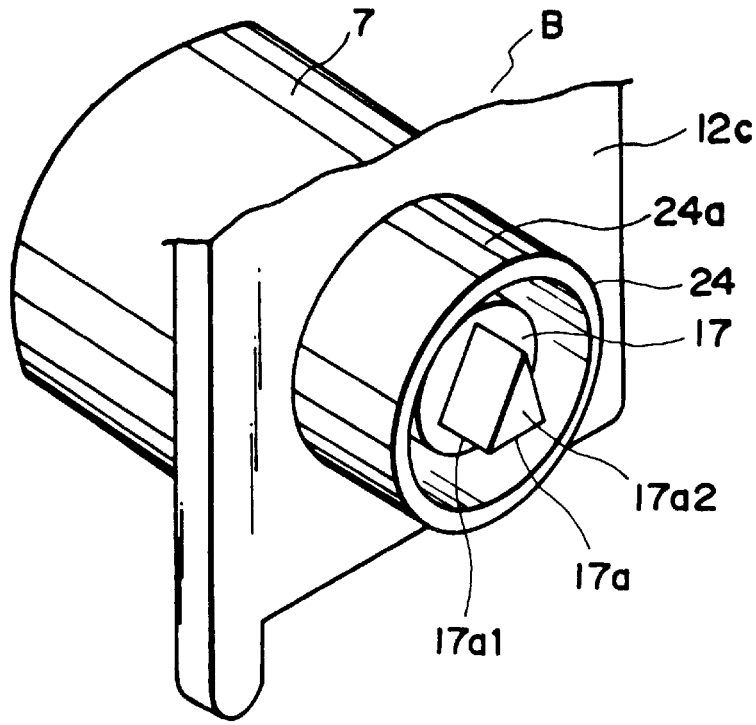
FIG. 16 is a perspective view of a side shaft coupling portion of a process cartridge according to Embodiment 1 of the present invention.
Figure 17:
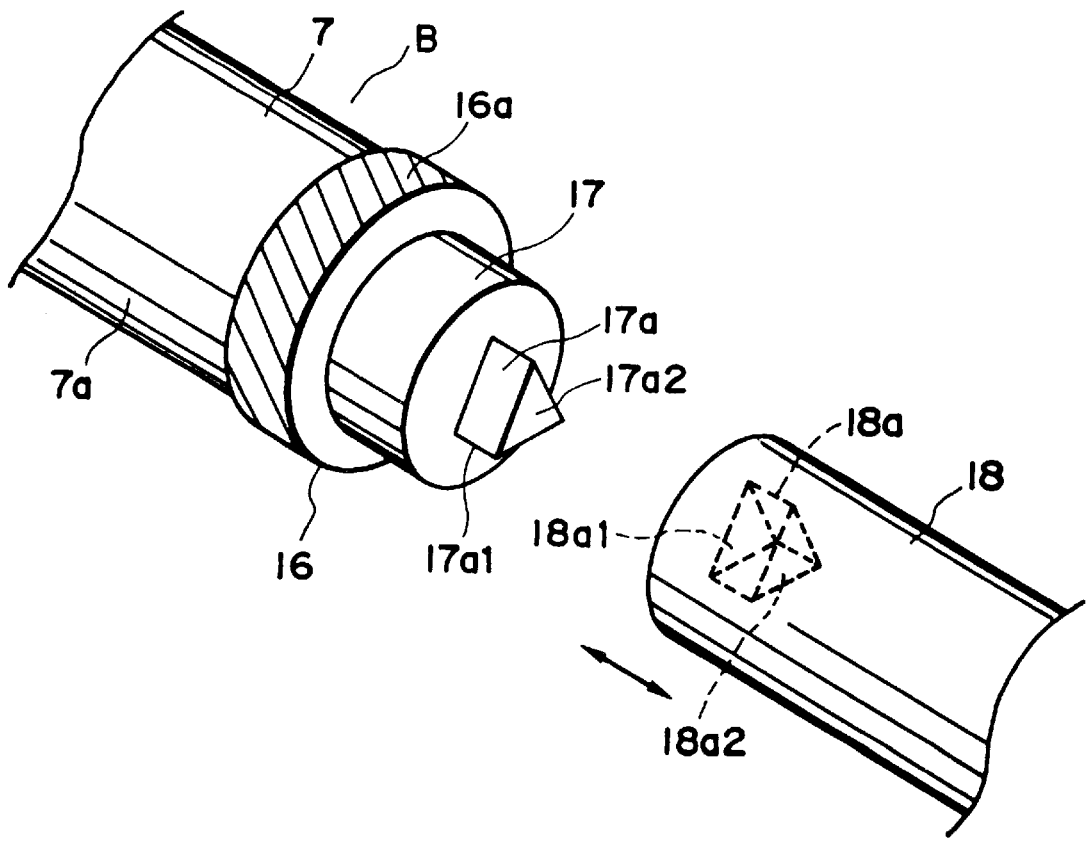
FIG. 17 is a perspective view of a shaft coupling used in the process cartridge and the main assembly of the electrophotographic image forming apparatus according to Embodiment 1 of the present invention.

FIG. 14 is a perspective view of a drum flange 16 as a driving force transmission part integral with the male coupling shaft 17; FIG. 15 is a partly sectional perspective view of the photosensitive drum 7 mounted to the drum flange 16; FIG. 16 is an enlarged perspective view around the male coupling shaft 17 of the process cartridge B shown in FIG. 11; and FIG. 17 is an illustration of a relation between the male coupling shaft 17 (provided in the process cartridge B) as the shaft coupling member and the female coupling shaft 18 (provision in the main assembly 14).

As shown in FIG. 11, and FIG. 15 to FIG. 17, a process cartridge shaft coupling means is provided at one longitudinal end of the photosensitive drum 7 mounted to the process cartridge B. The shaft coupling means is in the form of a male coupling shaft 17 (circular column configuration) on a drum flange 16 fixed to one end of the photosensitive drum 7, and has a non-twisted projection 17a formed at a free end of the male coupling shaft 17. The male coupling shaft 17 is engaged in a bearing 24 and functions as a drum shaft. In this example, the drum flange 16, male coupling shaft 17 and the projection 17a are integrally formed. The drum flange 16 is integrally provided with a helical drum gear 116a to transmit the driving force to the developing roller 9c in the process cartridge B. Therefore, as shown in FIG. 14, the drum flange 16 is an integrally molded product of plastic resin material having a helical gear 16a, male coupling shaft 17, and the projection 17a and the engaging member 16b, which will be described hereinafter, to constitute a driving force transmitting part having a function of transmitting a driving force.

Figure 24:
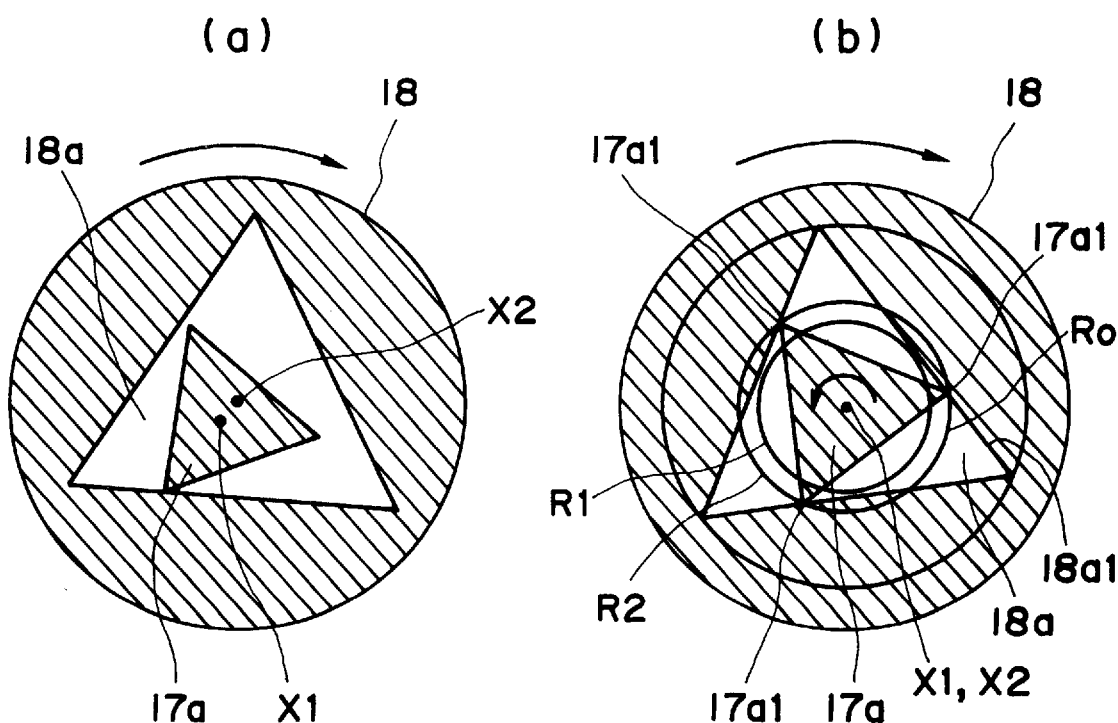
FIGS. 24(a) and 24(b) are sectional views taken along a plane perpendicular to the axis of the male coupling projection and recess according to Embodiment 1 of the present invention.

The projection 17a has a configuration of a non-twisted prism, and more particularly, it has a cross-section of a substantially equilateral triangle, and the recess 18a engageable with the projection 17a is a non-twisted hole having a cross section of a substantially equilateral triangle. The recess 18a rotates integrally with a large gear 34 provided in the main assembly 14 of the apparatus. With the structure of this embodiment, the process cartridge B is mounted to the main assembly 14, and the projection 17a and the recess 18a of the main assembly 14 are brought into engagement with each other. When the rotating force is transmitted from the recess 18a to the projection 17a, the edge lines of the equilateral triangular prism of the projection 17a are contacted to the corner constituted by the inner surfaces 18a1 of the equilateral triangle of the recess 18a at the entrance. Therefore, the axes are substantially aligned (FIG. 24). As described in the foregoing, by a leaf spring 41 provided on the apparatus guiding member 116 of the main assembly 14 (FIG. 27), the process cartridge B is urged toward the driving side in the axial direction of the photosensitive drum 7. Thus, the photosensitive drum 7 integral with the projection 17a is stably and correctly positioned both in the longitudinal direction and radial direction in the main assembly 14. The leaf spring 41 is not required.

The position of a cross-section of a three dimensional member is stably determined by three contact points in a plane perpendicular to the axis thereof, theoretically. When the contact positions 17a1 of the projections 17a are at apexes of a substantially equilateral triangle in the plane, and the cross-sectional configuration of the recess 18a is a substantially equilateral triangle, then the contact portions 17a1 of the projection 17a are contacted to the inner surfaces 18a1 of the equilateral triangle of the recess 18a under the same conditions. Therefore, the changes of the contact points and the rotation non-uniformity of the coupling driving due to the load variation during the rotation of the process cartridge B are minimized, thus improving the rotation accuracy of the photosensitive drum 7.

The male coupling shaft 17 and the projection 17a are provided on the drum flange 16 such that when the drum flange 16 is mounted to one end of the photosensitive drum 7, they are coaxial with the photosensitive drum 7. Designated by 16b is an engaging portion, and is engageable with the inner surface of the drum cylinder 7d. The fixing of the drum flange 16 to the photosensitive drum 7, may be by crimping or bonding. The circumference of the drum cylinder 7d is coated with a photosensitive layer 7b (FIGS. 11 and 15).

A drum flange 25 is fixed to the other side of the photosensitive drum 7. A spur gear 25b is integrally molded with the drum flange 25. The drum flange 25 is rotatably engaged with the drum shaft 7a integral with the flange 29 fixed to the cleaning frame 12c.

When the process cartridge B is mounted to the apparatus main assembly 14, the cylindrical guide 24a coaxial with the male coupling shaft 17 is engaged with the positioning groove 116b (FIG. 9) of the apparatus main assembly 14 and is correctly positioned, and the spur gear 25b molded integrally with the drum flange 25 is engaged with a gear (unshown) for transmitting the driving to the transferring roller 4.

Around the projection 17a of the male coupling shaft 17 of the process cartridge B, there is provided a hollow cylindrical boss 24a concentric with the male coupling shaft 17 in the cleaning frame 13 (FIGS. 4, 11 and 16). When the process cartridge B is mounted to or demounted from the main assembly, the non-twisted projection 17a is protected by the boss 24a, and therefore, the likelihood of damage thereto or deformation thereof is reduced. Thus, the vibration or wobbles during the coupling driving operation due to the damage of the projection 17a, can be avoided.

Examples of the material of the drum flanges 16 and 25, the shaft 17 and the projection 17a include polyacetal, polycarbonate, polyamide, polybutylene-terephthalate or another resin material. Other materials are usable and can be selected properly by one skilled in the art.

The boss 24a also functions as a cylindrical guide for the process cartridge B when it is mounted to the apparatus main assembly 14. When the process cartridge B is mounted to the apparatus main assembly 14, the boss 24a and the apparatus main assembly side guide portion 116c are abutted, and the boss 24a functions as a guiding member for the mounting of the process cartridge B to the mounting position, thus facilitating the mounting-and-demounting of the process cartridge B relative to the apparatus main assembly 14. When the process cartridge B has been mounted to the mounting position, said boss 24a is supported by the positioning groove 116d which is a recess provided in the guide portion 116c. When the male coupling shaft 17 and the female coupling shaft 18 are aligned axially by the driving force applied upon the image forming operation, the boss 24a is slightly raised from the groove 116d (approx. 0.3–1.0), wherein the gap between the boss 24a and the main assembly guide portion 116c (groove 116d) is smaller than the radial gap between the non-twisted projection 17a and the recess 18a. Therefore, the engagement between the non-twisted projection 17a and the recess 18a is enabled in the state in which the process cartridge B is mounted to the process cartridge B. A recess is provided at a rear part of the groove 116d. The configuration of the boss 24a is not limited to the cylindrical shape of this embodiment, and it is not inevitably completely cylindrical but may be partly-cylindrical provided that it can be guided by the guide portion 116c and can be supported by the groove 116d. In this embodiment, the cylindrical boss 24a and the bearing 24 for rotatably supporting the male coupling shaft 17 are integrally molded, and it is threaded (unshown) to the cleaning frame 13 (FIG. 11), but this is not inevitable, and the bearing 24 and boss 24a may be separate members.

In this embodiment, the drum flange 25 is engaged with the drum shaft 7a provided in the cleaning frame 13 (FIG. 11), and the male coupling shaft 17 is engaged with the inner surface of the bearing 24 provided in the cleaning frame 13; and in this state, the photosensitive drum 7 is mounted to the cleaning frame 13 of the process cartridge B. Then, the photosensitive drum 7 is rotated about the drum shaft 7a and the male coupling shaft 17. In this embodiment, the photosensitive drum 7 is mounted, for axial movement, to the cleaning frame 13. This is done in consideration of the mounting tolerance. This is not inevitable, and photosensitive drum 7 may be immovable in the axial direction.

Figure 18:
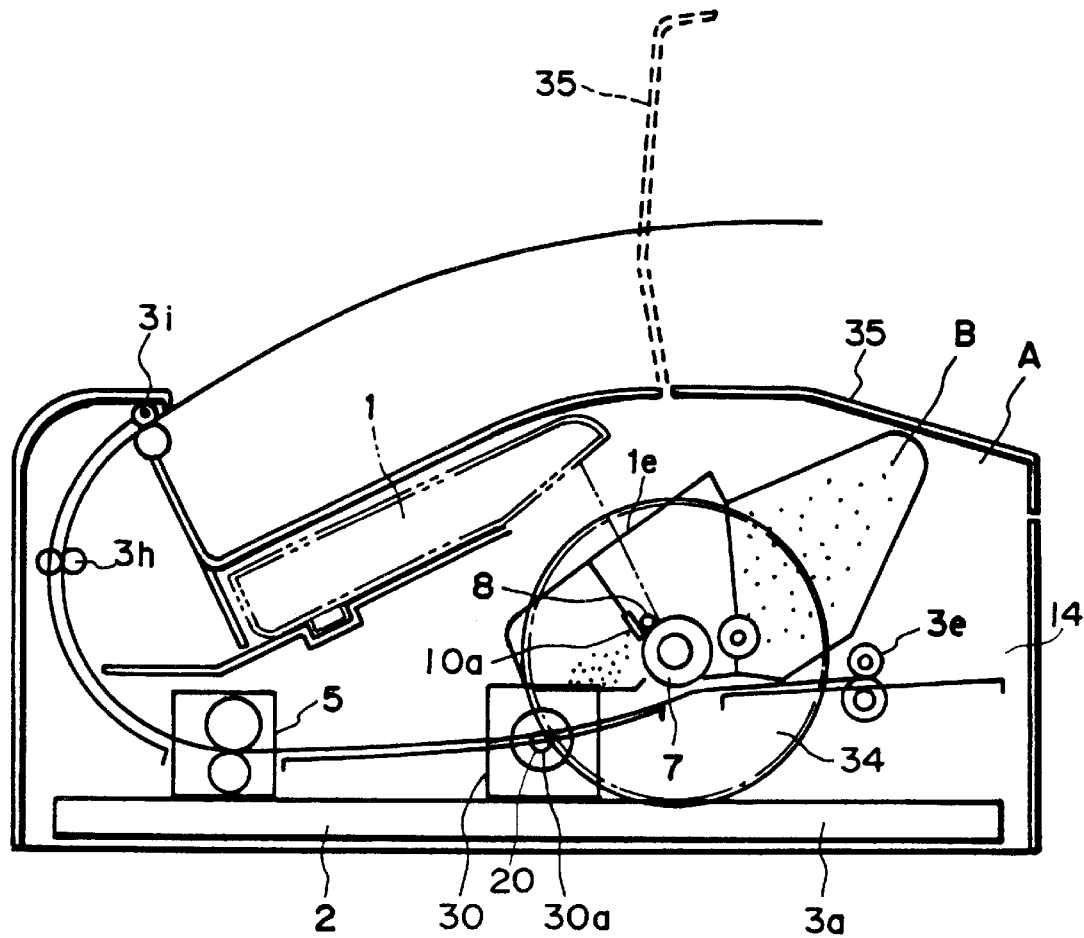
FIG. 18 is a cross-sectional view of a driving system provided in the main assembly of the electrophotographic image forming apparatus according to Embodiment 1 of the present invention.
Figure 19:
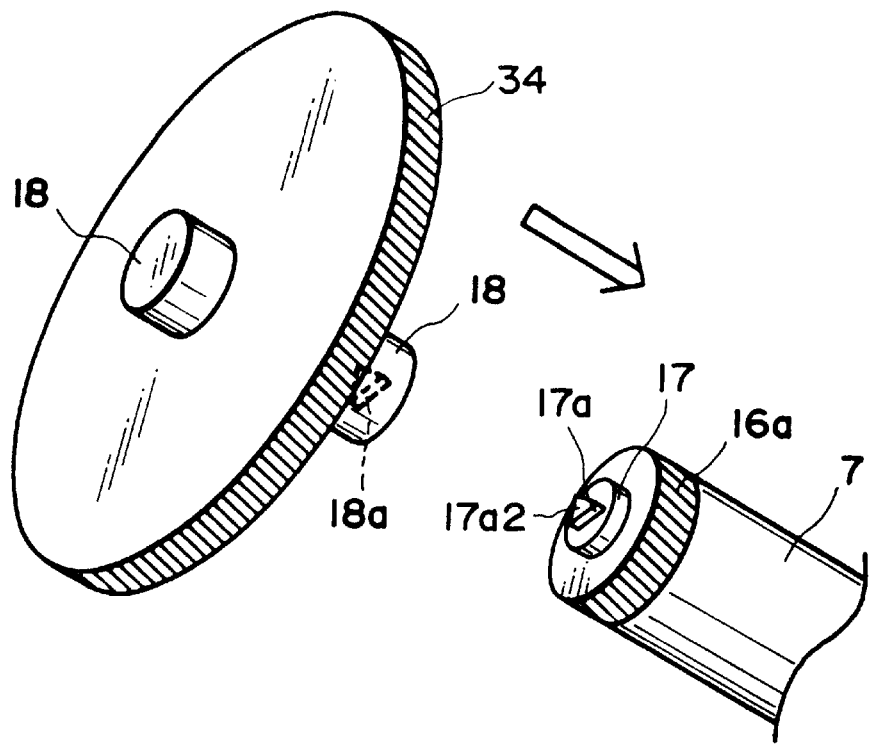
FIG. 19 is a perspective view of a shaft coupling member provided in the process cartridge and the shaft coupling member provided in the main assembly of the apparatus according to Embodiment 1 of the present invention.
Figure 20:
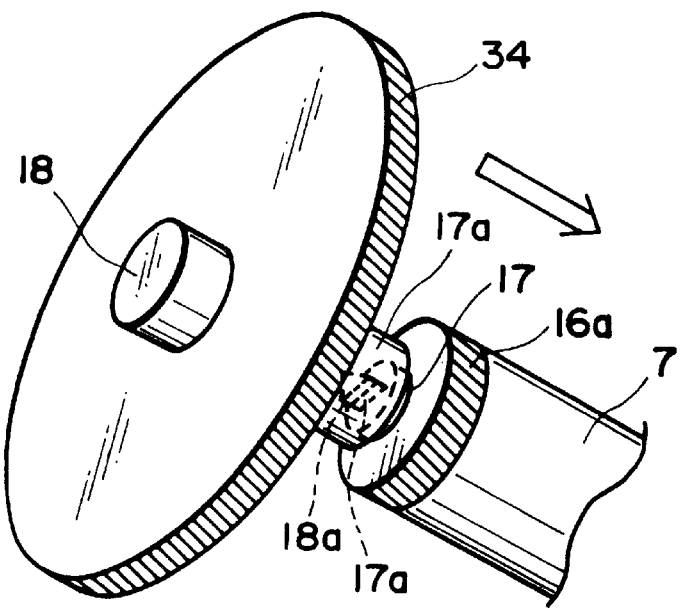
FIG. 20 is a perspective view of a coupling provided in the process cartridge and a shaft coupling member provided in the main assembly of the apparatus according to Embodiment 1 of the present invention.

On the other hand, the main assembly 13 of the image forming apparatus is provided with a main assembly side shaft coupling apparatus. The main assembly side shaft coupling apparatus has a female coupling shaft 18 (circular column configuration) at a position where the axis of the photosensitive drum and the rotation axis are coaxial when it is in engagement with the process cartridge side shaft coupling member and is rotated. The female coupling shaft 18, as shown in FIGS. 11, 18, is integral with the large gear 34 for transmitting the driving force from the motor 30 to the photosensitive drum 7. The female coupling shaft 18 is projected from a lateral end of the large gear 34 at the center of rotation of the large gear 34. In this embodiment, the large gear 34 and the female coupling shaft 18 are integrally produced by a mold.

The large gear 34 provided in the main assembly 14 is a helical gear. When the helical gear receives the driving force from the small gear 20 in the form of a helical gear fixed to the shaft 30a of the motor 30 shown in FIGS. 11, 18, a thrust force tending to move the female coupling shaft 18 toward the male coupling shaft 17 is produced due to the inclination direction and the angle of the teeth. Thus, when the motor 30 is driven for image formation, the female coupling shaft 18 is moved toward the male coupling shaft 17 also by the thrust to assist the engagement between the recess 18a and the projection 17a. The recess 18a is formed at the free end of the female coupling shaft 18 and at the center of rotation of the female coupling shaft 18.

In this embodiment, the driving force is transmitted directly from the small gear 20 fixed to the motor shaft 30a to the large gear 34, but this is not inevitable, and the use may be made with a gear train to effect reduced speed drive transmission, a pair of friction rollers, a combination of a timing belt and a pulley, or the like.

(Interrelating Device Between Openable Cover and Shaft Coupling)

Figure 21:
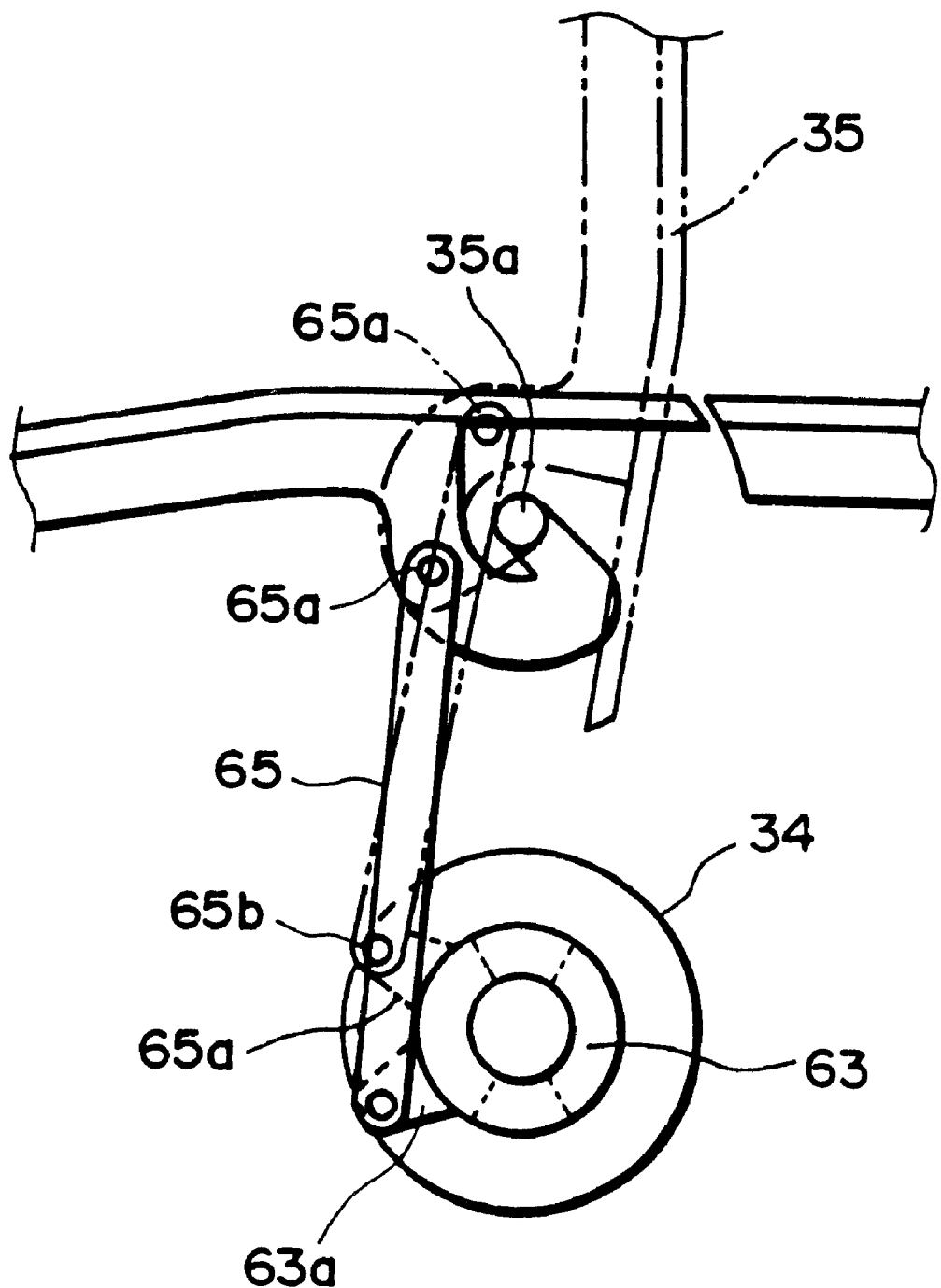
FIG. 21 is a longitudinal sectional view of a coupling portion and a cover of the main assembly of the apparatus according to Embodiment 1 of the present invention.
Figure 22:
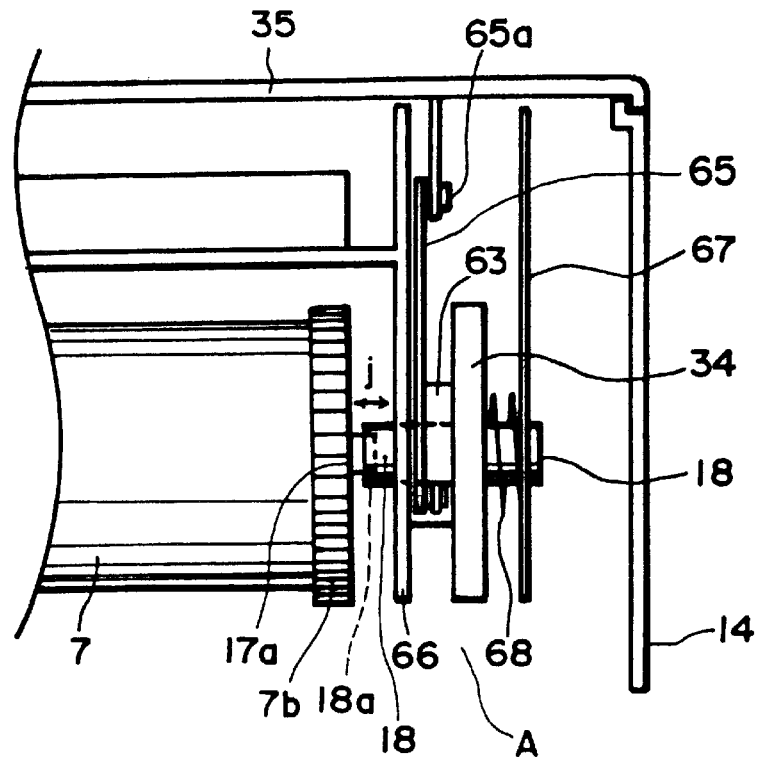
FIG. 22 is a side view of a structure of a female coupling shaft according to an embodiment of the present invention.
Figure 23:
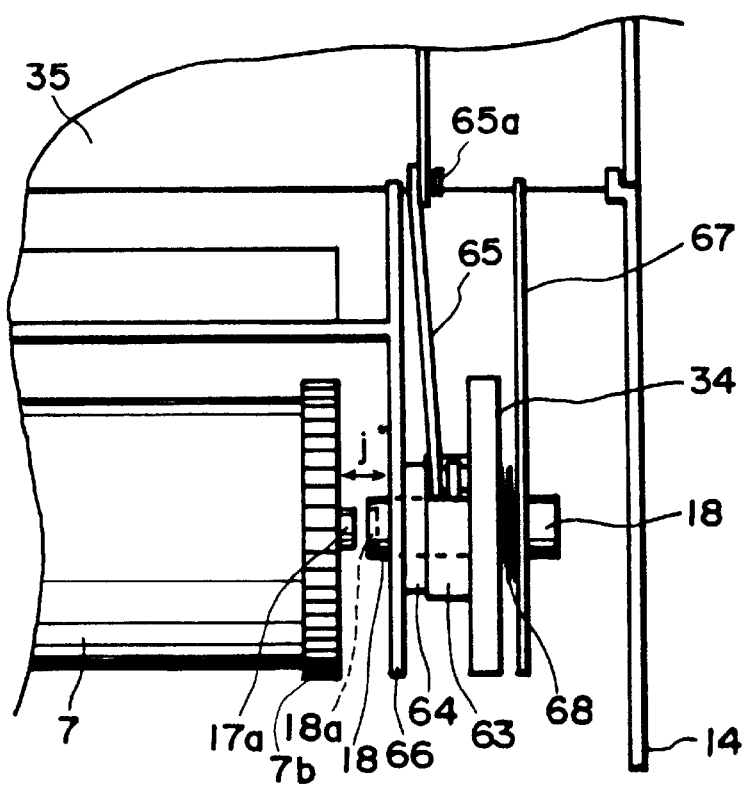
FIG. 23 is a side view showing the structure around the female coupling shaft when the mounting-and-demounting of the process cartridge is mounted to or demounted from the main assembly of the apparatus according to Embodiment 1 of the present invention.

Referring to FIGS. 21 to 23, a structure for engaging the recess 18a and the projection 17a in interrelation with a closing operation of the openable cover or lid 35.

As shown in FIG. 23, the large gear 34 fixed between the side plate 66 and the side plate 67 in the main assembly 14, and the female coupling shaft 18 coaxially integral with the large gear 34 is rotatably supported by the side plates 67, 66. An outer cam 63 and an inner cam 64 are closely inserted between the large gear 34 and the side plate 66. The inner cam 64 is fixed to the side plate 66, and the outer cam 63 is rotatably engaged with the female coupling shaft 18. The surfaces of the outer cam 63 and the inner cam 64 which are substantially perpendicular to the axial direction and which are faced to each other, are cam surfaces, and are screw surfaces coaxial with the female coupling shaft 18 and are contacted to each other. Between the large gear 34 and the side plate 67, a compression coil spring 68 is compressed and fitted around the female coupling shaft 18.

As shown in FIG. 21, an arm 63a is extended from an outer periphery of the outer cam 63 in a radial direction, and an end of the arm 63a is coupled with an end of a link 65 by pins 65a and 65b at a position opposite from the opening side when the openable cover 35 is closed.

FIG. 22 is a view as seen from the right side in FIG. 21. When the openable cover 35 is closed, the link 65, outer cam 63 and the like are at the positions shown in the Figure, where the non-twisted projection 17a and the recess 18a are engaged so that driving force can be transmitted from the large gear 34 to the photosensitive drum 7. When the openable cover 35 is opened, the pin 65a is rotated upward about the shaft or supporting point 35a, so that arm 63a is pulled up through the link 65, and the outer cam 63 is rotated; thus, relative sliding motion is caused between the outer cam 63 and the inner cam 64 to move the large gear 34 away from the photosensitive drum 7. At this time, the large gear 34 is pushed by the outer cam 63, and is moved against the compression coil spring 68 mounted between the side plate 67 and the large gear 34, by which the female coupling recess 18a is disengaged from the non-twisted projection 17a as shown in FIG. 23 to release the coupling to bring the process cartridge B into a demountable state.

On the contrary, when the openable cover 35 is closed, the pin 65a connecting the link 65 with the openable cover 35, is rotated downward about the shaft 35a. The link 65 is moved downward to push the arm 63a down, so that outer cam 63 is rotated in the opposite direction and is pushed by the compression coil spring 68. By this, the large gear 34 is moved to the left by the spring 68 from a position shown in FIG. 23 to a position shown in FIG. 22, so that large gear 34 is set again at a position of FIG. 22, and the female coupling recess 18a is engaged with the non-twisted projection 17a to re-establish a drive transmittable state. Thus, the demountable state and the drive transmittable state of the process cartridge B are established in response to opening and closing of the openable cover 35. When the outer cam 63 is rotated in the opposite direction by the closing of the openable cover 35 to move the large gear 34 to the left from the position of FIG. 23, the female coupling shaft 18 and the end surface of the male coupling shaft 17 may be abutted to each other so that non-twisted projection 17a and the female coupling recess 18a may not be engaged with each other. However, they will be brought into engagement as soon as starting of the image forming apparatus A, as will be described hereinafter.

Thus, in this embodiment, when the process cartridge B is mounted to or demounted from the main assembly 14 of the apparatus, the openable cover 35 is opened. In interrelation with the opening and closing of the openable cover 35, the female coupling recess 18a is moved in the horizontal direction (the direction of arrow j). When the process cartridge B is mounted to or demounted from the main assembly 14, the coupling of the main assembly 14 and the process cartridge B are not to be engaged. And, they should not be engaged. Thus, the mounting-and-demounting of the process cartridge B relative to the main assembly 14 can be carried out smoothly. In this example, the female coupling recess 18a is urged toward the process cartridge B by the large gear 34 being urged by the compression coil spring 68. When the non-twisted projection 17a and the recess 18a are to be brought into engagement, they may be abutted to each other, and therefore, they are not properly engaged. When, however, the motor 30 is first rotated after the process cartridge B is mounted to the main assembly 14, the female coupling recess 18a is rotated, by which they are instantaneously brought into engagement.

(Male Coupling Shaft and Female Shaft)

The function of the projection 17a and the recess 18a in the shaft coupling mechanism, will be described.

The female coupling shaft 18 provided in the main assembly 14 is supported so as to be movable in the axial direction but not in the radial direction. The process cartridge B is mounted to the main assembly 14 for movement in the radial direction of the photosensitive drum 7.

When the process cartridge B is mounted to the main assembly 14 of the apparatus, a cylindrical guide 13aL coaxial with the drum shaft 7a (FIG. 11) supporting the drum flange 25 mounted to the other longitudinal end of the photosensitive drum 7, enters the groove 116b (FIG. 9) in the receptor portion of the main assembly 14 without a gap and is correctly positioned, and the spur gear 25b molded integrally with the drum flange 25 is brought into meshing engagement with a gear (unshown) for transmitting the driving force to the transferring roller 4. On the other hand, at one longitudinal end (driving side) of the photosensitive drum 7, a boss 24a formed on the cleaning frame 13, is supported by groove 116d provided in the main assembly 14.

By closing the openable cover 35, the female coupling shaft 18 moves toward the male coupling shaft 17, and if the phases are aligned between the non-twisted projection 17a and the recess 18a, the recess 18a engages with the non-twisted projection 17a in the axial direction. At this time, if the phases are not aligned, the end surface 17a2 of the male coupling shaft 17 abuts the end surface of the female coupling shaft 18 and is pushed by the spring force of the compression coil spring 68.

Then, the driving side shaft coupling member operates as follows.

When the driving motor 30 is rotated, the female coupling shaft 18 is advanced by the spring force of the compression coil spring 68 when the phases are aligned between the projection 17a and the recess 18a (the phase alignment is reached at each 120° rotation in this embodiment), so that they are engaged with each other, and the rotating force is transmitted from the main assembly 14 to the process cartridge B.

The non-twisted projection 17a smoothly enters the recess 18a upon the engagement of the shaft coupling with a gap, because the section of the recess 18a (substantially equilateral triangle) is larger than the non-twisted projection 17a, as shown in FIG. 24, (a). Thus, static positioning accuracy between the male coupling shaft 17 and the female coupling shaft 18 is not required to be strict, but may be rough.

In this embodiment, the projection length of the above-described cylindrical boss 24a is larger than the projection length of the projection 17a (FIG. 11). When the projection 17a and the recess 18a are engaged, the inner surface of the cylindrical boss 24a is engaged with the outer peripheral surface of the female coupling shaft 18 to function as a guide for the engagement therebetween.

When the female coupling shaft 18 is rotated after the projection 17a enters the recess 18a, upon the image formation, the edge 18a1 at the inner surface of the recess 18a and the contact portion 17a1 of the projection 17a are abutted to permit driving force transmission. At this time, the male coupling shaft 17 moves instantaneously so that the inner surface 18a1 of the recess 18a and the contact portion 17a1 of the projection 17a are contacted uniformly (from the state shown in FIG. 24, (a) to the state shown in FIG. 24, (b)). Since the contact portion 17a1 exists at each of the apex points of a substantially equilateral triangle configuration, the male coupling shaft 17 and the female coupling shaft 18 become coaxial when the contact force becomes substantially uniform. More particularly, immediately after the projection 17a enters the recess 18a, the center X1 of the projection 17a and the center X2 of the recess 18a are not aligned (FIG. 24, (a)). When the recess 18a starts to rotate, the inner side thereof is contacted to the three contact portions 17a1 of the projection 17a, then the centers X1, X2 are substantially aligned (FIG. 24, (b)).

With such a structure, an automatic axial alignment is carried out between the male coupling shaft 17 and the female coupling shaft 18 upon the operation of the motor 30. By the transmission of the driving force to the photosensitive drum 7, a rotating force is applied to the process cartridge B. By this, an abutment (portion) 13j (FIGS. 4, 7) provided at an upper surface of the cleaning frame 13 of the process cartridge B is abutted to an abutment portion 26 (FIGS. 9, 10) fixedly provided in the main assembly 14, so that process cartridge B is correctly positioned relative to the main assembly 14.

When the driving force is not transmitted (when the image forming operation is not carried out), a gap is produced between the image forming apparatus and the recess 18a in the radial direction, the engagement and disengagement of the shaft coupling and the mounting-and-demounting of the process cartridge B relative to the main assembly 14 are easy. When the driving is effected, the urging force is provided with stabilization, so that play or vibration there can be suppressed.

In this embodiment, the non-twisted projection and recess have substantially equilateral triangle shapes, but the same effects can be provided when they are substantially regular polygonal configuration, and the projection has contact points corresponding to the configuration of the female coupling recess. Substantially regular polygonal configuration is desirable since then the positioning can be effected with high precision, but this is not limiting, and another polygonal shape is usable if configuration is such that axial alignment is established with axial force.

When the non-twisted coupling projection and the recess are compared, the projection is naturally easily damaged and the strength of the projection is poorer than the recess. In view of this, this embodiment is such that the non-twisted projection is provided in the exchangeable process cartridge B, and the female coupling recess is provided in the main assembly 14 of the image forming apparatus which is required to have a higher durability than the process cartridge.

Taking a process cartridge B as an example, this embodiment is summarized as follows. The process cartridge B is detachably mountable relative to a main assembly 14 of an electrophotographic image forming apparatus A for forming an image an a recording medium 2, said apparatus comprising a motor 30, a large gear 34 for receiving driving force from the motor 30, a recess 18a in the form of a hole of prism configuration integrally rotatable with the large gear 34, the hole being at the center portion of the large gear 34. The process cartridge B includes an electrophotographic photosensitive drum 7, process means actable on the electrophotographic photosensitive drum 7 (charging roller 8, developing roller 9c cleaning blade 10a), a projection 17a engageable with the recess 18a and contactable to an inner surface thereof, wherein when the process cartridge B is mounted to the main assembly 14 of the apparatus, and the large gear 34 is rotated with the process cartridge B being in engagement with the recess 18a, the rotating force is transmitted from the large gear 34 to the electrophotographic photosensitive drum 7 with the male coupling shaft 17 and the female coupling shaft 18 being substantially axially aligned.

The projection 17a is projected from a free end of a male coupling shaft 17 projected outwardly from the center of rotation of the photosensitive drum 7 in the longitudinal direction of the photosensitive drum 7. Here, the male coupling shaft 17 functions to rotatably support the photosensitive drum 7 on the cleaning frame 13.

The male coupling shaft 17 is provided at the center of the helical gear 116a on one side of the gear, and opposite side of the helical gear 116a is provided with an engaging portion 116b for engagement with an inner surface of the electrophotographic photosensitive drum 7. The non-twisted projection 17a, male coupling shaft 17, helical gear 116a and the engaging portion 116b are integrally molded from a resin material.

There is provided a cylindrical boss 24a enclosing the projection 17a or an arcuate configuration boss extended along a part of the projection 17a. The boss 24a functions to impart a relative movement between the recess 18a and the projection 17a to function as a cylindrical guide for the engagement therebetween.

More specific embodiments will be described. The module of the large gear 34 of the main assembly 14 of the apparatus is 0.4–0.7. The dedendum diameter of the large gear 34 is approx. 30 mm–150 mm, and the teeth number of the large gear 34 is approx. 40–400. The figures may be properly selected by one skilled in the art in consideration of the space in the main assembly 14, the desired quality of the image. The figures are not limiting. In this embodiment, the module of the large gear 34 is 0.5, the dedendum diameter is approx. 100, and the teeth number is 200.

The positioning of the process cartridge B relative to the main assembly 14 during the image formation (driving transmission) is summarized as follows.

The process cartridge B is positioned in the longitudinal direction by the engagement of the cartridge frame to the cartridge mounting portion of the main assembly 14 when it is mounted to the main assembly 14. In the perpendicular direction, the cylindrical guide 13aL is snugly fitted in the groove 116b so that it is correctly positioned in that direction. On the other hand, the boss 24a is simply supported in the groove 116b in the receptor portion. During the image formation operation (drive transmission), the process cartridge B is positioned such that projection 17a and the recess 18a are engaged with each other and are axially aligned. At this time, the boss 24a is away from the groove 116d. When the openable cover 35 of the main assembly is closed, the female coupling shaft 18 is moved toward the male coupling shaft 17. When the main assembly motor 30 is rotated, the projection 17a and the recess 18a are engaged with axial alignment therebetween, and in the axial direction, the process cartridge B is positioned by the groove 116d at one end of the photosensitive drum 7 and by a rotating recess 18a at the other end. The photosensitive drum 7 is movable in its longitudinal direction (by approx. 0.1 mm–1.0 mm) in consideration of an assembling tolerance. When the photosensitive drum 7 is supported for longitudinal movement, the axial direction thereof is determinated relative to the cleaning frame 13, as described in the foregoing. The process cartridge B is mounted to the main assembly, for movement (by approx. 0.1 mm–3 mm) relative to a plate (mounting guide portions 116a, 116c) of the main assembly in view of the assembling tolerance, and is moved in the radial direction of the photosensitive drum 7.

During the image formation operation, the process cartridge B receives a rotational force in the rotational direction of the photosensitive drum 7, by which the abutment portion 13j of the process cartridge B is abutted to an abutment portion or a fixing member 26 functioning as an abutment in the main assembly 14.

Accordingly, the process cartridge B is correctly positioned relative to the main assembly 14 of the apparatus in both the longitudinal direction and the radial direction during the image formation operation.

(Positioning of Process Cartridge in the Longitudinal Direction)

Referring to FIGS. 25, 26, 27 and 28, the description will be made as to a structure for further stably and further accurately positioning the process cartridge in the longitudinal direction of the photosensitive drum 7 when the process cartridge B is mounted to the main assembly of the apparatus.

Figure 27:
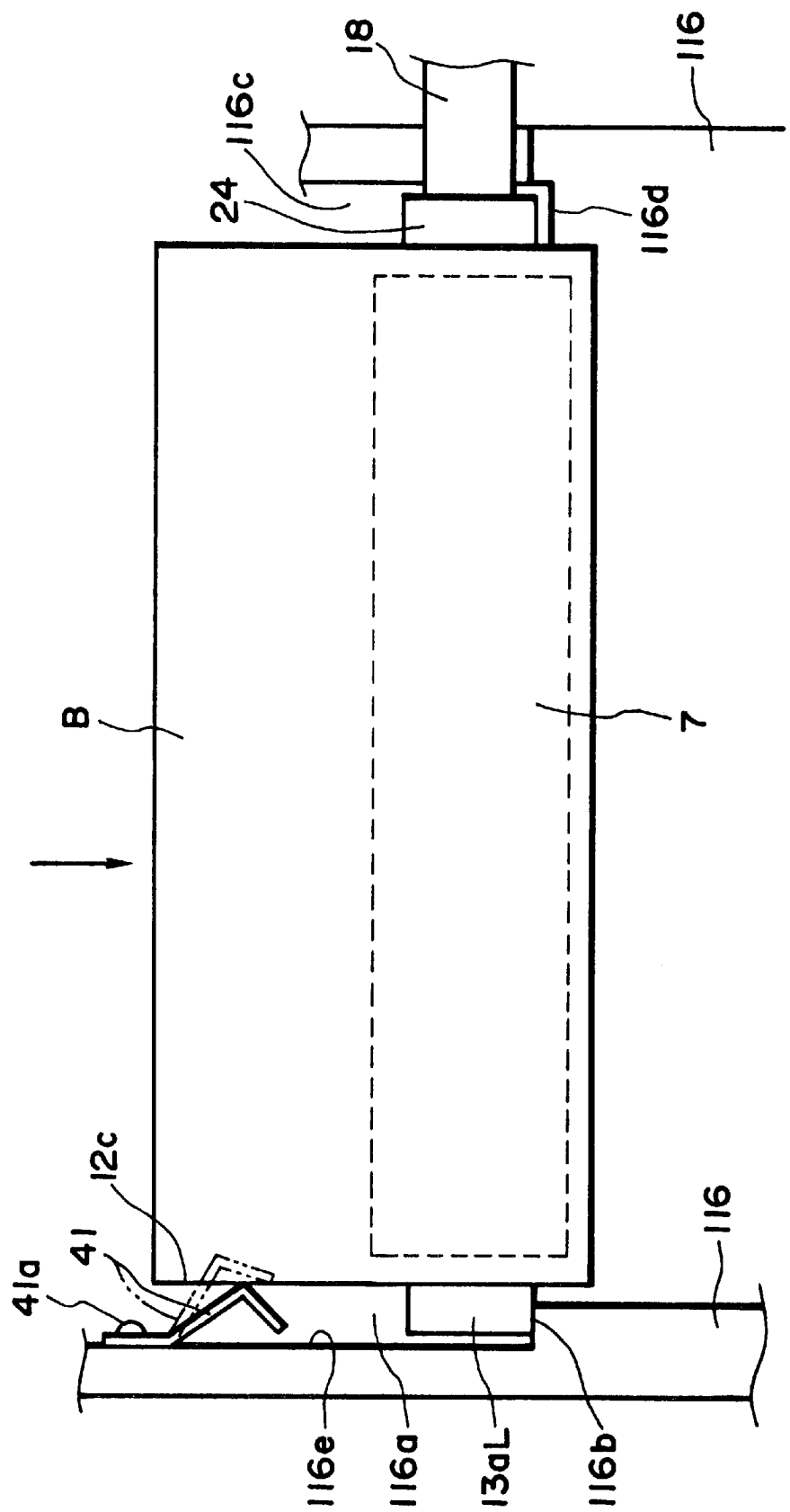
FIG. 27 is a side view of a leaf spring provided in a main assembly of an apparatus.

When the process cartridge B is mounted to the main assembly 14 of the image forming apparatus while moving it in the direction indicated by the arrow shown in FIG. 27, the process cartridge B pushes the leaf spring 41 from a position indicated by the dotted lines to the position indicated by the solid lines, as shown in FIG. 27.

Figure 26:
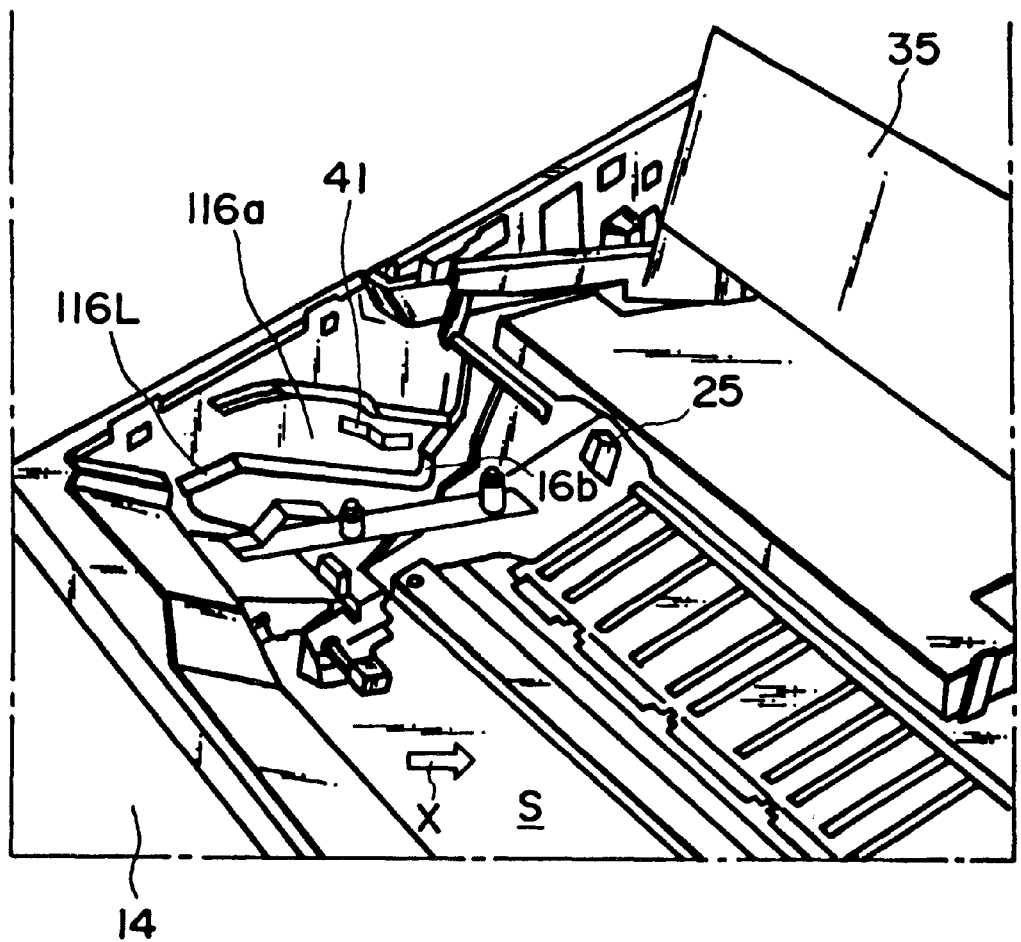
FIG. 26 is a perspective view of a leaf spring provided in a main assembly of an apparatus.

The leaf spring 41 is provided adjacent to the groove 116b of the cartridge mounting portion so as to urge the side plate, for example, the flange 29 (FIG. 11) of the cleaning frame 13 (it may be called a drum frame since it contains at least the photosensitive drum 7) of the process cartridge B, as shown in FIG. 26. An end of the leaf spring 41 is fixed by small screw 41a to the side surface 116e continuing from the guide portion 116a so that the L-shaped spring action portion is supported in a cantilever fashion.

The leaf spring 41 has a spring force sufficient to move the process cartridge B in the longitudinal direction, when the process cartridge B is mounted to the cartridge mounting portion of the main assembly 14. The spring force is on the other hand within a range permitting the above-described aligning (centering) function for the shaft coupling. The positioning of the process cartridge B by stopping the movement of the process cartridge B in the longitudinal direction by the leaf spring 41, is effected (1) by abutting, to a member of the main assembly 14, the cylindrical boss 24a (FIGS. 11, 16) projected outwardly from the bearing 24 supporting the male coupling shaft 17, or (2) by abutting, to the mounting guiding member 116, the side plate, for example the mounting flange 13aR1, of the cleaning frame 13 which side plate is at the longitudinally opposite side of the side plate of the cleaning frame 13 abutted to the leaf spring 41. Alternatively, the end surface of the projection 17a2 is abutted to a bottom surface 18a2 of the recess, or the end surface 116c (FIG. 11) of the drum flange is abutted to the entrance part of the recess 18a. It is desirable that adjacent a point of intersection between the line parallel with the photosensitive drum 7 and passing through a point of contact of the leaf spring 41 to one side plate of the cleaning frame 13 and the other side plate of the cleaning frame 13, the mounting guiding member 116 is contacted to the other side plate, since then the force applied by the leaf spring 41 to the process cartridge B is not eccentric. The mounting guiding member 116 may be abutted to the other side plate at a large area.

After the process cartridge B is mounted to the cartridge mounting portion of the main assembly 14, the cartridge side shaft coupling member and the main assembly side shaft coupling member of the apparatus are engaged with each other in response to the closing operation of the openable cover 35, as will be described hereinafter.

According to this embodiment, the leaf spring 41 urges the cleaning frame 13 which is a frame supporting the photosensitive drum 7. Therefore, no other member is used for the positioning so that assembling accuracy of the frame or the like is not influenced. The side plate of the cleaning frame 13 is urged adjacent the cylindrical guide 13aL provided at the side opposite from the supporting, positioning and driving side for the process cartridge B. The driving side bearing 24 is raised from the groove 116d at the driving side while the cylindrical guide 13aL is supported in the groove 116b provided at the side opposite from the driving side, so that axis of the photosensitive drum 7 is aligned. Since the leaf spring 41 and the cylindrical guide 13aL are closer to each other, the coupling alignment operation between the process cartridge B and the main assembly 14 is hardly influenced at this time.

Figure 28:
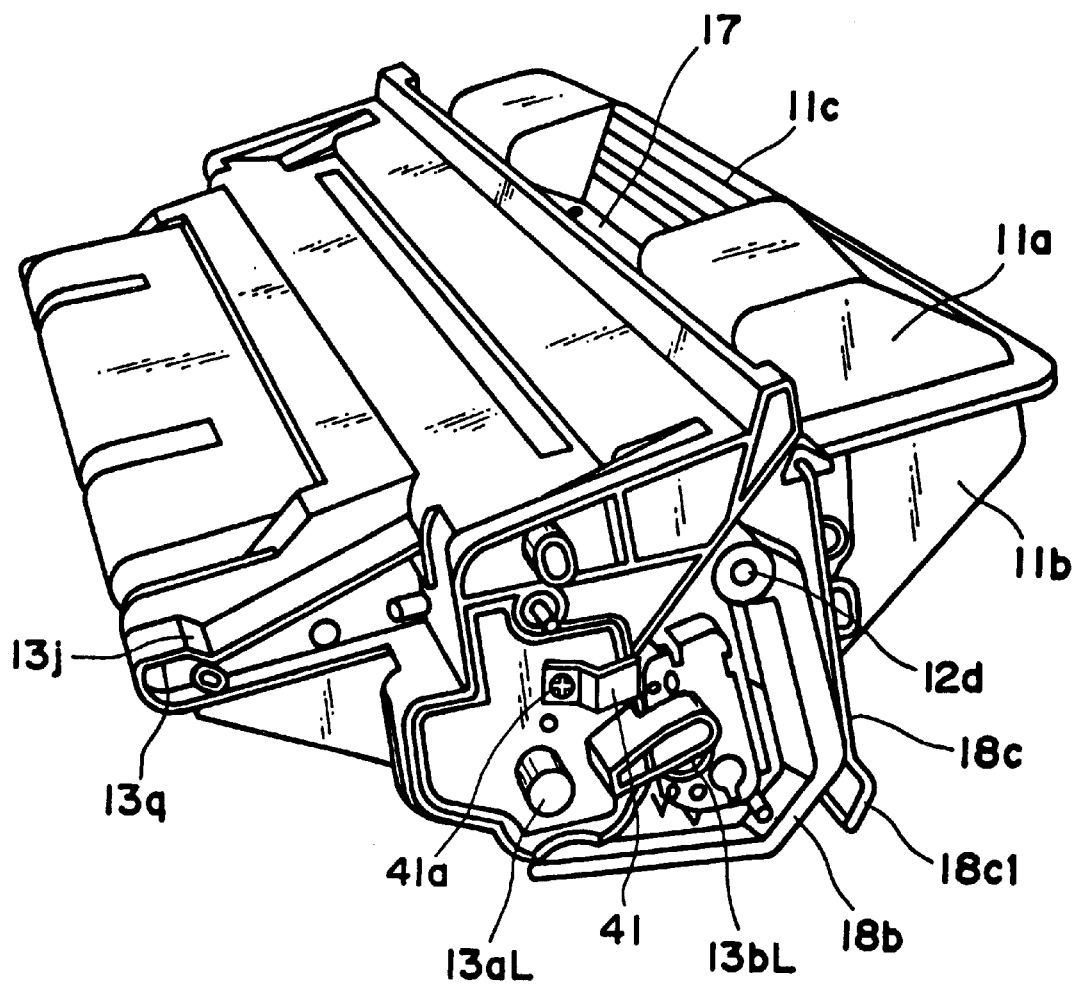
FIG. 28 is a perspective view of a leaf spring provided in a process cartridge.
Figure 29:
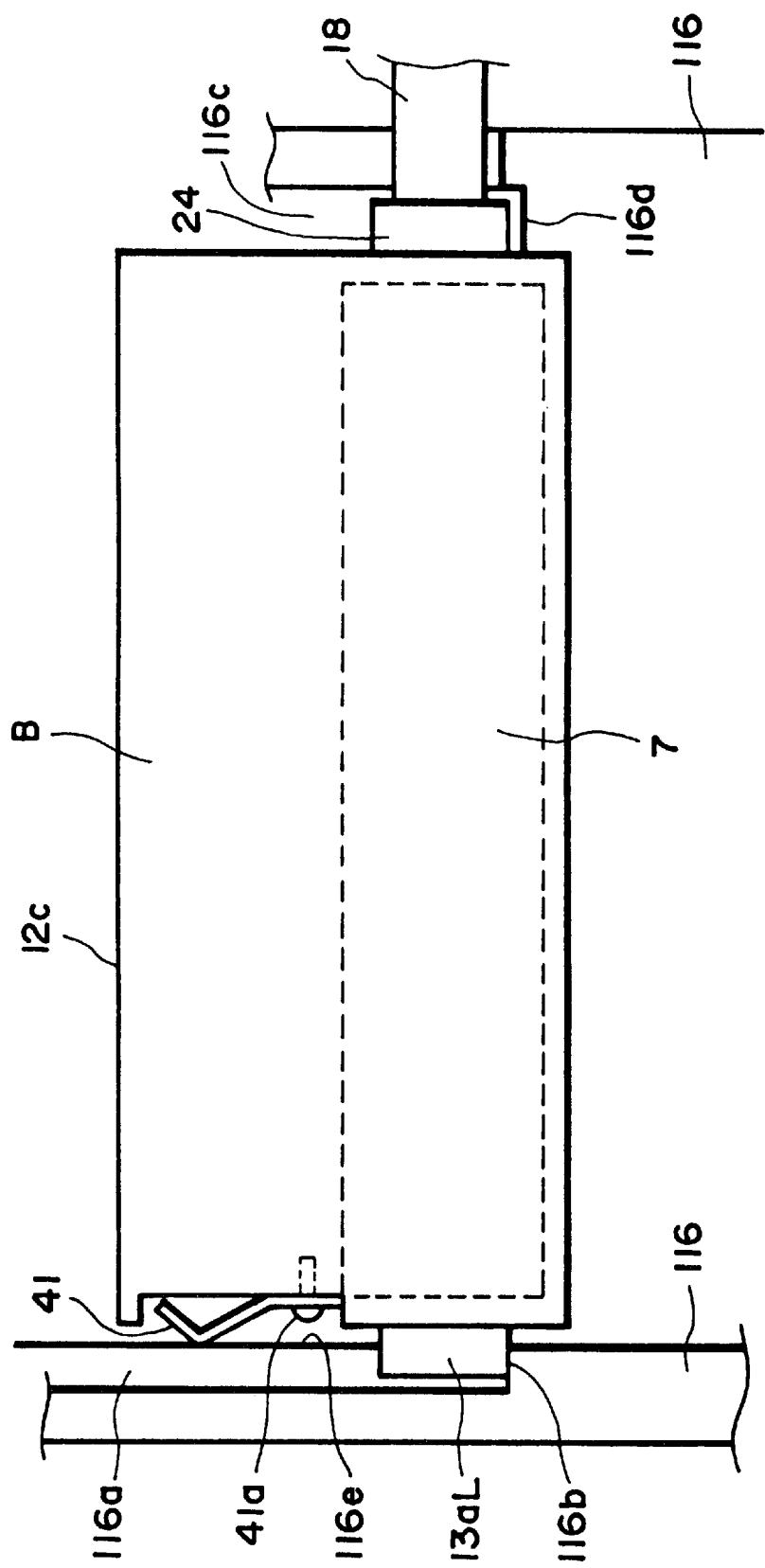
FIG. 29 is a side view of a leaf spring rovided in a process cartridge.
Figure 30:
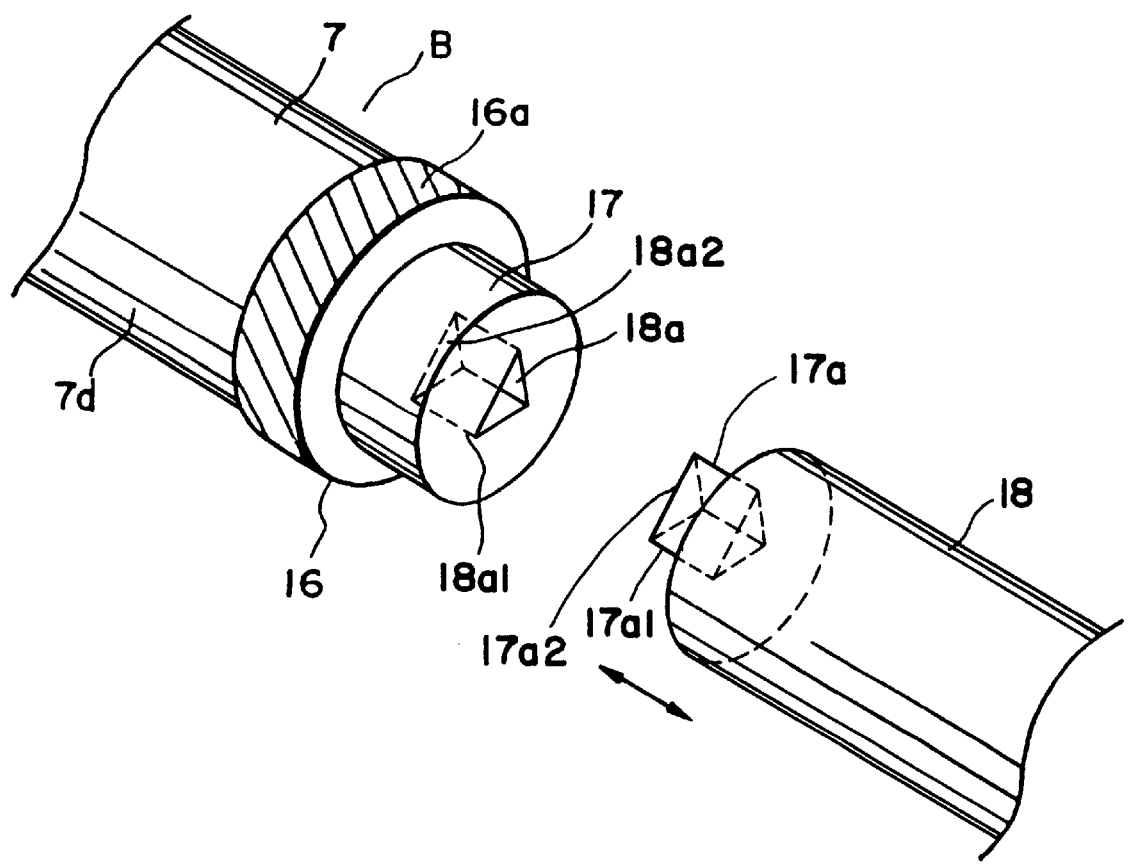
FIG. 30 is a perspective view of a shaft coupling according to an attentive embodiment.

FIGS. 28 and 29 show an examples wherein the process cartridge B rather than the main assembly is provided with a spring 41.

In this embodiment, the leaf spring 41 is mounted to an outer surface of the cleaning frame 13 at a side (non-driving side) opposite, in the longitudinal direction of the photosensitive drum, from the side where the non-twisted projection 17a is provided. The leaf spring 41 takes a position substantially above the guide 13aL when the process cartridge is mounted to the main assembly 14. When the process cartridge B is mounted to the main assembly 14, it urges the process cartridge B in the direction of inserting the projection 17a into the recess 18a.

Therefore, above the cylindrical guide 13aL, the leaf spring 41 is fixed to the side plate, for example, the flange 29, of the cleaning frame 13 by the small screw 41a. The leaf spring 41 has an extension from the end where it is fixed by the small screw 41a, the extension being L-shaped and being resiliently deformed by the side surface 116e adjacent the guide portion 116a.

With such a structure, when the process cartridge B is mounted to the main assembly 14, the leaf spring 41 is abutted to the side surface 116e adjacent the main assembly mounting guide member 116 so that process cartridge B is urged in the axial direction of the photosensitive drum 7.

Therefore, the process cartridge B can be positioned in the longitudinal direction of the photosensitive drum further stably and further correctly.

In the foregoing embodiment, the leaf spring 41 is disposed at a side opposite from the driving side so as to urge the process cartridge B toward the driving side, but this is not inevitable. For example, the leaf spring 41 may be disposed at the driving side so as to urge the process cartridge B away from the driving side. In such a case, the abutment portions between the process cartridge B and the main assembly 14 may be the cleaning frame 13 of the process cartridge B and a part of the main assembly mounting guide member 116; or an end surface of the cylindrical guide 13aL and a part of the main assembly mounting guide member 116.

In the foregoing embodiment, the use is made with a leaf spring, but this is not limiting.

According to the embodiment, the spring member is provided at one longitudinal end portion of the process cartridge, and the spring member is presscontacted to the cartridge mounting portion of the main assembly of the image forming apparatus, and therefore, the process cartridge is urged and positioned to the wall surface at the 116c side of the cartridge mounting member so that longitudinal position of the process cartridge is assuredly determined. Therefore, the longitudinal position of the electrophotographic photosensitive drum is correctly determined relative to the process cartridge. The shaft coupling is automatically aligned or centered to correctly determine the position of the center of the electrophotographic photosensitive member.

The longitudinal position of the process cartridge can be determined irrespective of the longitudinal position of the spring member.

When the spring member is a leaf spring, the length (height) of the spring may be small so that space required by the provision of the spring member can be saved.

By the provision of the spring member in the drum frame for supporting the electrophotographic photosensitive drum, the assembling accuracy of the process cartridge is not influenced.

The advantageous effects can be provided also in an electrophotographic image forming apparatus having a spring member for urging the process cartridge at one wall surface of the process cartridge mounting member.

The spring member in the main assembly of the electrophotographic image forming apparatus may be disposed at the driving side or at the non-driving side, and the axial position of the electrophotographic photosensitive member can be correctly positioned in either case.

If the spring member in the main assembly is a leaf spring, the spring member can be disposed without any substantial space for the spring.

Figure 25:
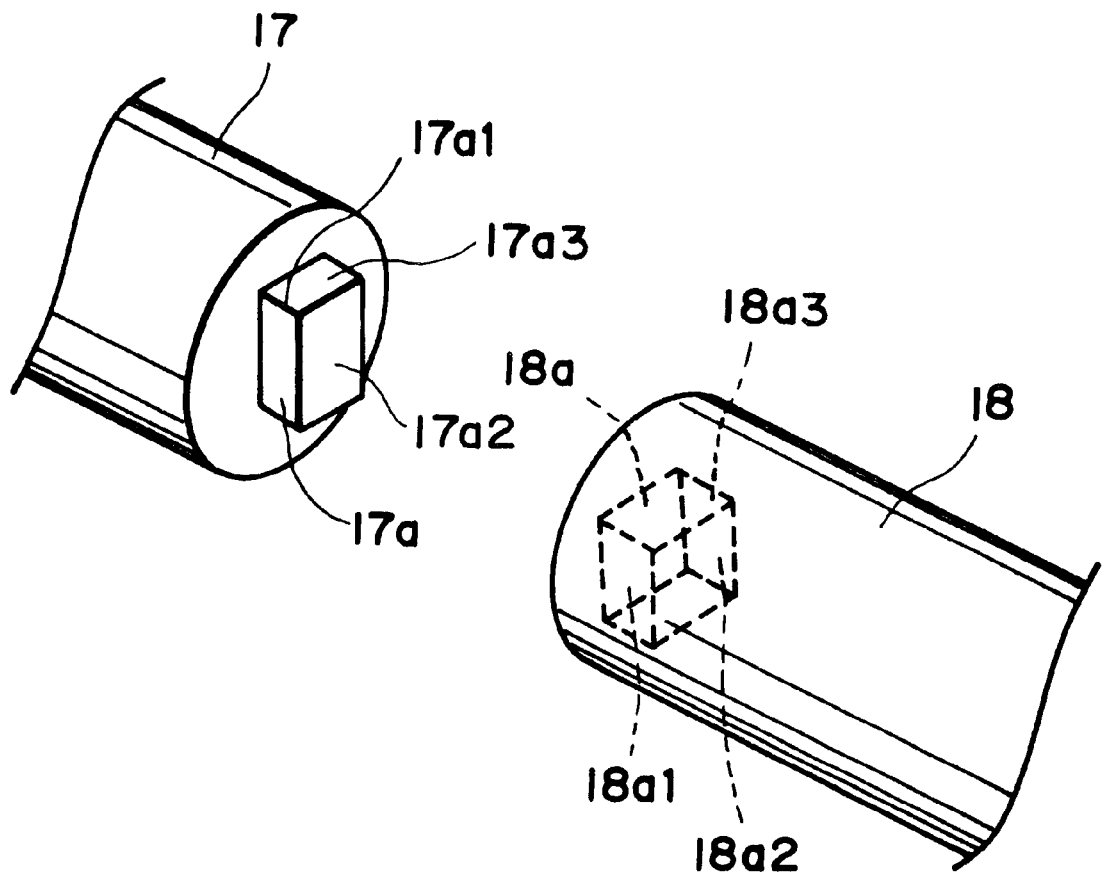
FIG. 25 is a perspective view of a coupling projection and a coupling recess according to a further embodiment of the present invention.

Another configuration of the recess 18a of the female coupling shaft 18 and the projection 17a of the male coupling shaft 17, will be described. In the embodiment, the projection 17a is a non-twisted rectangular prism, and the recess 18a engageable with the projection 17a is a non-twisted rectangular prism (FIG. 25). When the projection 17a and the recess 18a of the main assembly 14 are engaged with each other, and the driving force is transmitted from the recess 18a to the projection 17a, the surface 17a3 of the projection 17a is abutted to the surface 18a3 of the recess 18a, so that the driving force is stably transmitted.

In this embodiment, the projection 17a is a rectangular prism, and the recess 18a is a non-twisted rectangular prism. This is not limiting, and another polygonal prism is usable.

Further Embodiments

In the foregoing Embodiment 1, the configurations of the projection 17a of the male coupling shaft 17 and the recess 18a of the female coupling shaft 18 are substantially equilateral triangular prism, but the configurations are not limited to this. For example, in an alternative, the recess 18a may have a polygonal cross-section having odd number sides, and the projection 17a may be a deformed circle (such as triangle with rounded apices) having the same number of equilateral sides, and the projection 17a may have prism edge lines, and the portion between the edge lines are concave toward the center, for example, the cross-section is a grooved circular.

In the foregoing embodiment, the configurations of the projection 17a of the male coupling shaft 17 and the recess 18a of the female coupling shaft 18 may be such that only one of them has a twisted positive prism configuration.

In the foregoing embodiment, the drum flange 16 and the male coupling shaft 17 are integral with 15 each other, but the male coupling shaft 17 may be manufactured separately, and then mounted the drum flange 16.

In this embodiment, the process cartridge B was described as a process cartridge which forms a monochromatic image, but the present invention is applicable, with desirable effects, to a process cartridge which comprises a plurality of developing means for forming an image composed of a plurality of colors (for example, a two tone image, three tone images, full color images, or the like).

The electrophotographic photosensitive member does not need to be limited to the photosensitive drum 7. For example, the following types may be included. First, as for the photosensitive material, photoconductive material such as amorphous silicon, amorphous selenium, zinc oxide, titanium oxide, organic photoconductor, and the like, may be included. As for the configuration of the base member on which photosensitive material is placed, it may be in the form of a drum or belt. For example, the drum type photosensitive member comprises a cylinder formed of aluminum alloy or the like, and a photoconductor layer deposited or coated on the cylinder.

As for the image developing method, various known methods may be employed; for example, a two-component magnetic brush type developing method, a cascade type developing method, a touch-down type developing method, a cloud type developing method, and the like.

Also in this embodiment, a so-called contact type charging method was employed, but obviously, charging means with a structure different from the one described in this embodiment may be employed; for example, one of the conventional structures, in which a tungsten wire is surrounded by a metallic shield formed of aluminum or the like, on three sides, and positive or negative ions generated by applying high voltage to the tungsten wire are transferred onto the surface of a photosensitive drum to uniformly charge the surface of the photosensitive drum.

The charging means may in the form of a blade (charge blade), a pad, a block, a rod, a wire, or the like, in addition to being in the form of a roller.

As for the method for cleaning the toner remaining on the photosensitive drum, a blade, a fur brush, a magnetic brush, or the like may be employed as a structural member for the cleaning means.

As described in the foregoing, according to the present invention, the process cartridge can be positioned in the longitudinal direction of the photosensitive drum when the process cartridge is mounted to the main assembly of the apparatus.

While the invention has been described with reference to the structures disclosed herein, it is not confined to the details set forth and this application is intended to cover such modifications or changes as may come within the purposes of the improvements or the scope of the following claims.

What is claimed is:

1. A process cartridge detachably mountable to a main assembly of an electrophotographic image forming apparatus, wherein said main assembly includes a motor, a rotatable driving member for receiving a driving force from said motor, and a non-twisted recess which is substantially coaxial with said rotatable driving member, said process cartridge comprising:

an electrophotographic photosensitive drum;

process means actable on said photosensitive drum; and a non-twisted projection engageable with said recess, said projection being provided at a longitudinal end of said photosensitive drum, wherein when said rotatable driving member starts rotation, said recess and said projection are contacted to each other at least at three positions to transmit rotational driving force from said rotatable driving member to said photosensitive drum through engagement between said recess and said projection.

2. A process cartridge according to claim 1, wherein said projection is a substantially triangular prism.

3. A process cartridge according to claim 1, wherein said projection is a substantially equilateral triangular prism having corners which are chamfered.

4. A process cartridge according to claim 1, further comprising a drum flange at one longitudinal end of said photosensitive drum, wherein said drum flange has a shaft for rotatably supporting said photosensitive drum on a cartridge frame, wherein said flange is integrally molded with said projection.

5. A process cartridge according to claim 1, further comprising a cartridge frame having a circular outer wall at least partly enclosing a circumference of said projection, wherein when said process cartridge is mounted to said main assembly, said circular outer wall is engaged with a cavity in said main assembly.

6. A process cartridge according to claim 1, wherein said recess has a substantially triangular cross-section.

7. A process cartridge according to claim 6, wherein said cross-section of said recess is substantially equilateral triangular.

8. A process cartridge according to claim 1, 2, 3, 4, 5, 6, or 7, wherein said process means includes at least charging means for charging said photosensitive drum, developing means for developing a latent image formed on said photosensitive drum, and cleaning means for removing residual toner from said photosensitive drum.

9. A process cartridge detachably mountable to a main assembly of an electrophotographic image forming apparatus, wherein said main assembly includes a motor, a rotatable driving member for receiving a driving force from said motor, and a non-twisted projection which is substantially coaxial with said rotatable driving member, said process cartridge comprising:

an electrophotographic photosensitive drum;

process means actable on said photosensitive drum; and a non-twisted recess engageable with said projection, said recess being provided at a longitudinal end of said photosensitive drum, wherein said rotatable driving member starts rotation, said recess and said projection are contacted to each other at least at three positions to trasmit rotational driving force from said rotatable driving member to said photosensitive drum through engagement between said recess and said projection.

10. A process cartridge according to claim 9, wherein said projection is a substantially triangular prism.

11. A process cartridge according to claim 9, wherein said projection is a substantially equilateral triangular prism having corners which are chamfered.

12. A process cartridge according to claim 9, further comprising a drum flange at one longitudinal end of said photosensitive drum, wherein said drum flange has a shaft for rotatably supporting said photosensitive drum on a cartridge frame, wherein said flange is integrally molded with said recess.

13. A process cartridge according to claim 9, further comprising a cartridge frame having a circular outer wall at least partly enclosing a circumference of said recess, wherein when said process cartridge is mounted to said main assembly, said circular outer wall is engaged with a cavity in said main assembly.

14. A process cartridge according to claim 9, wherein said recess has a substantially triangular cross-section.

15. A process cartridge according to claim 14, wherein said cross-section of said recess is substantially equilateral triangular.

16. A process cartridge according to claim 9, 10, 11, 12, 13, 14, or 15, wherein said process means includes at least charging means for charging said photosensitive drum, developing means for developing a latent image formed on said photosensitive drum, and cleaning means for removing residual toner from said photosensitive drum.

17. A process cartridge detachably mountable to a main assembly of an electrophotographic image forming apparatus for forming an image on a recording material, said main assembly including a motor, a rotatable driving member for receiving a driving force from said motor and one of a non-twisted recess and non-twisted projection having a non-circular cross-section and substantially coaxial with a rotation axis of said rotatable driving member, said process cartridge comprising:

a rotatable electrophotographic photosensitive drum;

process means actable on said photosensitive drum; and the other of said non-twisted projection and non-twisted recess provided at a longitudinal end of said photosensitive drum, having a non-circular cross-section and being substantially coaxial with a rotating axis of said photosensitive drum, wherein said other of said projection and recess of said photosensitive drum has such a dimension and configuration that it can take a first relative position with respect to said one of said recess and projection of said rotatable driving member in which relative rotational movement therebetween is permitted, and a second relative rotational position with respect to said one of said recess and projection of said driving rotatable member in which relative rotational movement is prevented in one rotational direction, while the rotation axis of said rotatable driving member and the rotation axis of said photosensitive drum are substantially aligned, wherein when said rotatable driving member starts rotation, said recess and said projection are contacted to each other at least at three positions to transmit rotational driving force from said rotatable driving member to said photosensitive drum through engagement between said recess and said projection.

18. A process cartridge according to claim 17, wherein said projection is a substantially triangular prism.

19. A process cartridge according to claim 17, wherein said projection is a substantially equilateral triangular prism having corners which are chamfered.

20. A process cartridge according to claim 17, further comprising a drum flange at one longitudinal end of said photosensitive drum, wherein said drum flange has a shaft for rotatably supporting said photosensitive drum on a cartridge frame, wherein said flange is integrally molded with said other of said projection and recess.

21. A process cartridge according to claim 17, further comprising a cartridge frame having a circular outer wall at least partly enclosing a circumference of said other of said projection and recess, wherein when said process cartridge is mounted to said main assembly, said outer wall is engaged with a cavity in said main assembly.

22. A process cartridge according to claim 17, wherein said recess has a substantially triangular cross-section.

23. A process cartridge according to claim 22, wherein said cross-section of said recess is substantially equilateral triangular.

24. A process cartridge according to claim 17, 18, 19, 20, 21, 22, or 23, wherein said process means includes at least charging means for charging said photosensitive drum, developing means for developing a latent image formed on said photosensitive drum, and cleaning means for removing residual toner from said photosensitive drum.

25. A process cartridge according to claim 1, 9, or 17, further comprising a resilient member for urging said process cartridge in a longitudinal direction of said photosensitive drum when said process cartridge is mounted to said main assembly.

26. An electrophotographic image forming apparatus for forming an image on a recording material, to which apparatus a process cartridge is detachably mountable, said apparatus comprising:

(a) a motor;

(b) a rotatable driving member for receiving a driving force from said motor;

(c) a non-twisted recess which is substantially coaxial with said rotatable driving member;

(d) a mounting member for detachably mounting a process cartridge, said process cartridge including:

an electrophotographic photosensitive drum;

process means actable on said photosensitive drum; and a non-twisted projection engageable with said recess, said projection being provided at a longitudinal end of said photosensitive drum, wherein when said rotatable driving member starts rotation, said recess and said projection are contacted to each other at least at three positions to transmit rotational driving force from said rotatable driving member to said photosensitive drum through engagement between said recess and said projection; and (e) a feeding member for feeding the recording material.

27. An apparatus according to claim 26, wherein said projection of said process cartridge is a substantially triangular prism.

28. An apparatus according to claim 26, wherein said projection of said process cartridge is a substantially triangular prism having corners which are chamfered.

29. An apparatus according to claim 26, wherein said process cartridge further comprises a drum flange at one longitudinal end of said photosensitive drum, wherein said drum flange has a shaft for rotatably supporting said photosensitive drum on a cartridge frame, wherein said flange is integrally molded with said projection.

30. An apparatus according to claim 26, wherein said process cartridge further comprises a cartridge frame having a circular outer wall at least partly enclosing a circumference of said projection, wherein when said process cartridge is mounted to said apparatus, said circular outer wall is engaged with a cavity in said apparatus.

31. An apparatus according to claim 26, wherein said recess has a substantially triangular cross-section.

32. An apparatus according to claim 31, wherein said cross-section of said recess is substantially equilateral triangular.

33. An apparatus according to claim 26, wherein said process means contained in said process cartridge includes at least charging means for charging said photosensitive drum, developing means for developing a latent image formed on said photosensitive drum, and cleaning means for removing residual toner from said photosensitive drum.

34. An apparatus according to claim 26, further comprising a resilient member for urging said process cartridge in a longitudinal direction of said photosensitive drum when said process cartridge is mounted to said apparatus.

35. An electrophotographic image forming apparatus for forming an image on a recording material, to which a process cartridge is detachably mountable, said apparatus comprising:
(a) a motor;
(b) a driving rotatable member for receiving a driving force from said motor;
(c) a non-twisted projection which is substantially coaxial with said driving rotatable member; and
(d) a mounting member for detachably mounting a process cartridge, said process cartridge including:
an electrophotographic photosensitive drum;
process means actable on said photosensitive drum: and
a non-twisted recess engageable with said projection, said recess being provided at a longitudinal end of said photosensitive drum, wherein when said rotatable driving member starts rotation, said recess and said projection are contacted to each other at least at three positions to transmit rotational driving force from said rotatable driving member to said photosensitive drum through engagement between said recess and said projection.

36. An apparatus according to claim 35, wherein said projection of said process cartridge is a substantially triangular prism.

37. An apparatus according to claim 35, wherein said projection of said process cartridge is a substantially triangular prism having corners which are chamfered.

38. An apparatus according to claim 35, wherein said process cartridge further comprises a drum flange at one longitudinal end of said photosensitive drum, wherein said drum flange has a shaft for rotatably supporting said photosensitive drum on a cartridge frame, wherein said flange is integrally molded with said projection.

39. An apparatus according to claim 35, wherein said process cartridge further comprises a cartridge frame having a circular outer wall at least partly enclosing a circumference of said projection, wherein when said process cartridge is mounted to said apparatus, said circular outer wall is engaged with a cavity in said apparatus.

40. An apparatus according to claim 35, wherein said recess has a substantially triangular cross-section.

41. An apparatus according to claim 40, wherein said cross-section of said recess is substantially equilateral triangular.

42. An apparatus according to claim 35, wherein said process means contained in said process cartridge includes at least charging means for charging said photosensitive drum, developing means for developing a latent image formed on said photosensitive drum, and cleaning means for removing residual toner from said photosensitive drum.

43. An apparatus according to claim 35, further comprising a resilient member for urging said process cartridge in a longitudinal direction of said photosensitive drum when said process cartridge is mounted to said apparatus.

44. A process cartridge according to claim 1, 9 or 17, wherein said rotatable driving member provided in the main assembly is a gear.

45. An apparatus according to claim 26 or 35, wherein said rotatable driving member is a gear.

46. A process cartridge detachably mountable to a main assembly of an electrophotographic image forming apparatus, wherein said main assembly includes a motor, a rotatable driving member for receiving a driving force from the motor, and a non-twisted recess which is substantially coaxial with said rotatable driving member, wherein said recess has a substantially triangular cross-section, said process cartridge comprising:
an electrophotographic photosensitive drum;
a charging member for charging said photosensitive drum; and
a non-twisted projection having a substantially triangular cross-section and engageable with said recess, said projection being provided at a longitudinal end of said photosensitive drum, wherein when said rotatable driving member starts rotation, said recess and said projection are contacted to each other at least at three positions to transmit rotational driving force from said rotatable driving member to said photosensitive drum through engagement between said recess and said projection.

47. A process cartridge according to claim 46, wherein said projection is a substantially equilateral triangular prism having corners which are chamfered.

48. A process cartridge according to claim 46, further comprising a drum flange at one longitudinal end of said photosensitive drum wherein said drum flange has a shaft for rotatably supporting said photosensitive drum on a cartridge frame, wherein said flange is integrally molded with said projection.

49. A process cartridge according to claim 46, further comprising a cartridge frame having a circular outer wall at least partly enclosing a circumference of said projection, wherein when said process cartridge is mounted to said main assembly, said outer wall is engaged with a cavity in said main assembly.

50. A process cartridge according to claim 46, wherein said recess of said main assembly has a substantially equilateral triangular cross-section.

51. A process cartridge according to claim 46, 47, 48, 49, or 50, further comprising at least one of developing means for developing a latent image formed on said photosensitive drum, and cleaning means for removing residual toner from said photosensitive drum.

52. A process cartridge detachably mountable to a main assembly of an electrophotographic image forming apparatus, wherein said main assembly includes a motor, a rotatable driving member for receiving a driving force from said motor, and a non-twisted projection which has a substantially triangular cross-section and which is substantially coaxial with said rotatable driving member, said process cartridge comprising:

an electrophotographic photosensitive drum;

a charging member for charging said photosensitive drum; and a non-twisted recess engageable with said projection, wherein said recess has a substantially triangular cross-section, said recess being provided at a longitudinal end of said photosensitive drum, wherein when said rotatable driving member starts rotation, said recess and said projection are contacted to each other at least at three positions to transmit rotational driving force from said rotatable driving member to said photosensitive drum through engagement between said recess and said projection.

53. A process cartridge according to claim 52, wherein said projection is a substantially equilateral triangular prism having corners which are chamfered.

54. A process cartridge according to claim 52, further comprising a drum flange at one longitudinal end of said photosensitive drum, wherein said drum flange has a shaft for rotatably supporting said photosensitive drum on a cartridge frame, wherein said flange is integrally molded with said recess.

55. A process cartridge according to claim 52, further comprising a cartridge frame having a circular outer wall at least partly enclosing a circumference of said recess, wherein when said process cartridge is mounted to said main assembly, said outer wall is engaged with a cavity in said main assembly.

56. A process cartridge according to claim 52, wherein said recess has a substantially equilateral triangular cross-section.

57. A process cartridge according to claim 52, 53, 54, 55, or 56 further comprising at least one of developing means for developing a latent image formed on said photosensitive drum, and cleaning means for removing residual toner from said photosensitive drum.

58. An electrophotographic image forming apparatus for forming an image on a recording material, to which apparatus a process cartridge is detachably mountable, said apparatus comprising:

(a) a motor;

(b) a driving rotatable member for receiving a driving force from said motor;

(c) a non-twisted recess which is substantially coaxial with said driving rotatable member and has a substantially triangular cross-section;

(d) a mounting member for detachably mounting said process cartridge, said process cartridge including:
an electrophotographic photosensitive drum;
a charging member for charging said photosensitive drum; and
a non-twisted, substantially triangular projection engageable with said recess, said projection being provided at a longitudinal end of said photosensitive drum, wherein when said rotatable driving member starts rotation, said recess and said projection are contacted to each other at least at three positions to transmit rotational driving force from said rotatable driving member to said photosensitive drum through engagement between said recess and said projection; and (e) a feeding member for feeding the recording material.

59. An electrophotographic image forming apparatus for forming an image on a recording material, to which apparatus a process cartridge is detachably mountable, said apparatus comprising:

(a) a motor (b) a driving rotatable member for receiving a driving force from said motor;

(c) a non-twisted, substantially triangular projection which is substantially coaxial with said driving rotatable member;

(d) a mounting member for detachably mounting said process cartridge, said process cartridge including:
an electrophotographic photosensitive drum;
a charging member for charging said photosensitive drum; and
a non-twisted recess engageable with said projection, wherein said recess has a substantially triangular cross-section and is provided at a longitudinal end of said photosensitive drum, wherein when said rotatable driving member starts rotation, said recess and projection are contacted to each other at least at three positions to transmit rotational driving force from said rotatable driving member to said photosensitive drum through engagement between said recess and said projection.

60. A process cartridge according to claim 46 or 52, wherein said driving rotatable member provided in the main assembly is a gear.

61. An apparatus according to claim 58 or 59, wherein said driving rotatable member is a gear.

* * * * *

UNITED STATES PATENT AND TRADEMARK OFFICE
CERTIFICATE OF CORRECTION

PATENT NO. : 6,006,058
DATED : December 21, 1999
INVENTOR(S) : Kazushi Watanabe, et al.

Page 1 of 3

It is certified that error appears in the above-identified patent and that said Letters Patent is hereby corrected as shown below:

Title page,
ITEM [56] REFERENCES CITED; FOREIGN PATENT DOCUMENTS:
"of 1936" should read -- 4/1936 --.

Column 3:
Line 32, "rovided" should read -- provided --.
Line 35, "attentive" should read -- alternative --.

Column 6:
Line 39, "leftand" should read -- left and --.

Column 13:
Line 58, "assembly 13" should read -- assembly 14 --.

Column 19
Line 59, "an" should be deleted.

Column 20:
Line 31, "the use is made with" should read -- use is made of --.
Line 35, "presscontacted" should read -- press contacted --.

Column 21:
Line 25, "are" should read -- is --.

Column 22:
Line 43, "claim 1," should read -- claim 1, 2 or 3, --.
Line 49, "claim 1," should read -- claim 4, --.
Line 55, "claim 1," should read -- claim 1, 2 or 3, --.
Line 58, "equilateral" should read -- equilaterally --.
Line 60, "claim 1, 2, 3, 4, 5, 6," should read -- claim 1, 2 or 3, --.
Line 61, "or 7," should be deleted.

Column 23:
Line 22, "claim 9," should read -- claim 9, 10 or 11, --.
Line 28, "claim 9," should read -- claim 12, --.
Line 32, "cavity" should read -- recess --.
Line 34, "claim 9," should read -- claim 9, 10 or 11, --.
Line 37, "equilateral" should read -- equilaterally --.
Line 39, "claim 9, 10, 11, 12, " should read -- claim 9, 10 or 11, --.
Line 40, "13, 14, or 15" should be deleted.

UNITED STATES PATENT AND TRADEMARK OFFICE
CERTIFICATE OF CORRECTION

PATENT NO.    : 6,006,058
DATED         : December 21, 1999
INVENTOR(S)   : Kazushi Watanabe, et al.

Page 2 of 3

It is certified that error appears in the above-identified patent and that said Letters Patent is hereby corrected as shown below:

Column 24:
Line 18, "claim 17," should read -- claim 17, 18 or 19, --.
Line 23, "claim 17," should read -- claim 20, --.
Line 28, "cavity" should read -- recess --.
Line 32, "equilateral" should read -- equilaterally --.
Line 34, "claim 17, 18, 19, 20," should read -- claim 17, 18 or 19, --.
Line 35, "21, 22, or 23," should be deleted.

Column 25:
Line 18, "cavity" should read -- recess --.
Line 22, "equilateral" should read -- equilaterally --.
Line 57, "of said process cartridge" should be deleted.
Line 60, "of said process cartridge" should be deleted.
Line 67, "projection." should read -- recess. --.

Column 26:
Line 6, "cavity" should read -- recess --.
Line 8, "recess" should read -- recess of said process cartridge --.
Line 10, "equilateral" should read -- equilaterally --.
Line 51, "claim 46," should read -- claim 46 or 47, --.
Line 61, "cavity" should read -- recess --.
Line 63, " claim 46, should read -- claim 46, 47 or 49, --.
Line 66, "claim 46, 47, 48, 49," should read -- claim 46, 47, 48 or 49, --.
Line 67, "or 50," should be deleted.

UNITED STATES PATENT AND TRADEMARK OFFICE
CERTIFICATE OF CORRECTION

PATENT NO. : 6,006,058
DATED : December 21, 1999
INVENTOR(S) : Kazushi Watanabe, et al.

Page 3 of 3

It is certified that error appears in the above-identified patent and that said Letters Patent is hereby corrected as shown below:

Column 27,
Line 28, "claim 52," should read -- claim 52 or 53, --.
Line 38, "cavity" should read -- recess --.
Line 43, "claim 52, 53, 54, 55," should read -- claim 52, 53 or 55, --.
Line 44, "or 56" should be deleted.

Column 28,
Line 10, "non-twisted, substantially" should read -- non-twisted projection, having a substantially --; and "projection" should read -- cross-section and --.
Line 28, "non-twisted, substantially" should read -- non-twisted projection, which has a --; and "projection" should read "cross-section and --.

Signed and Sealed this

Thirteenth Day of November, 2001

Attest:

*Nicholas P. Godici*

NICHOLAS P. GODICI
*Attesting Officer*   *Acting Director of the United States Patent and Trademark Office*